(12) United States Patent
Holman, Jr. et al.

(10) Patent No.: US 9,041,387 B2
(45) Date of Patent: May 26, 2015

(54) 360-DEGREE ANGLE SENSOR

(76) Inventors: Perry A. Holman, Jr., Garland, TX (US); Jason Chilcote, Frisco, TX (US)

( * ) Notice: Subject to any disclaimer, the term of this patent is extended or adjusted under 35 U.S.C. 154(b) by 1002 days.

(21) Appl. No.: 13/037,950

(22) Filed: Mar. 1, 2011

(65) Prior Publication Data

US 2012/0223699 A1 Sep. 6, 2012

(51) Int. Cl.
*G01B 7/30* (2006.01)
*G01R 33/07* (2006.01)
*G01R 33/09* (2006.01)
*G01D 5/14* (2006.01)
*G01D 5/245* (2006.01)

(52) U.S. Cl.
CPC .............. *G01D 5/145* (2013.01); *G01D 5/2451* (2013.01)

(58) Field of Classification Search
USPC .................................................. 324/207.25
See application file for complete search history.

(56) References Cited

U.S. PATENT DOCUMENTS

| | | | |
|---|---|---|---|
| 6,104,185 A * | 8/2000 | Lamm et al. ............... | 324/207.2 |
| 6,707,293 B2 | 3/2004 | Wan et al. | |
| 2002/0089327 A1 * | 7/2002 | Spellman ................... | 324/207.21 |
| 2003/0128026 A1 * | 7/2003 | Lutz ............................ | 324/207.2 |
| 2008/0121831 A1 * | 5/2008 | Ikeda ......................... | 251/129.11 |
| 2011/0246133 A1 * | 10/2011 | Harada et al. ................ | 702/151 |

FOREIGN PATENT DOCUMENTS

| | | |
|---|---|---|
| DE | 3446049 A1 | 6/1986 |
| DE | 19928482 A1 | 12/2000 |
| DE | 10017061 A1 | 10/2001 |
| DE | 10248060 A1 | 5/2004 |
| DE | 102004050586 A1 | 4/2006 |
| EP | 1 870 677 A2 | 12/2007 |

OTHER PUBLICATIONS

"Applications of Magnetic Position Sensors," Solid State Electronics Center, downloaded from http://www51.honeywell.com/aero/common/documents/Applications-of-magnetic-position-sensors.pdf, 8 pages, downloaded on Feb. 28, 2011.
Application Sheet, "How to Apply Honeywell APS00B AMR Sensors," downloaded from http://sensing.honeywell.com/index.cfm/ci_id/158863/la_id/1/document/1/re_id/0, 7 pages, downloaded on Feb. 28, 2011.

(Continued)

*Primary Examiner* — Bot Ledynh
(74) *Attorney, Agent, or Firm* — Thompson Patent Law; Craige Thompson

(57) ABSTRACT

This disclosure is directed to techniques for magnetic field angular position sensing. A device designed in accordance with this disclosure may include a magnetoresistive sensor configured to generate a signal indicative of an angular position of a magnetic field, the signal having an angular range of 180 degrees, a first polarity sensor configured to generate a signal indicative of a polarity of the magnetic field sensed from a first location, and a second polarity sensor configured to generate a signal indicative of a polarity of the magnetic field sensed from a second location different from the first location.

16 Claims, 21 Drawing Sheets

(56) References Cited

OTHER PUBLICATIONS

Magnetoresistive Sensors, "Industry: Position and Solid State Sensing," downloaded from http://sensing.honeywell.com/index.cfm/ci_id/140970/1a_id/1/document/1/re_id/0, 3 pages, downloaded on Feb. 28, 2011.

European Examination Report, Application No. 12157558.3, Received Aug. 14, 2014, 4 pages.

* cited by examiner

360-DEGREE ANGLE SENSOR

This disclosure relates to magnetic field sensors, and more particularly, to magnetic field sensors configured to sense an angular position of a magnetic field.

BACKGROUND

Magnetic position sensing involves the use of a magnetic sensor to provide an indication of the angular position of a rotatable magnetic field. One existing type of magnetic field sensor is an anisotropic magnetoresistive (AMR) sensor. An AMR sensor may include resistive elements that are configured into one or more Wheatstone bridge configurations. Each of the resistive elements may have a resistance that varies according to the magnitude and/or direction of a magnetic field that is incident upon the respective resistive element. The Wheatstone bridge configuration may generate an output voltage value that is indicative of the change in resistance caused by the amplitude and direction of the magnetic field.

Some types of AMR devices are configured to generate a unique output voltage value for rotational angles of an incident magnetic field within a range of 180 degrees. For example, an AMR device may include two Wheatstone bridge configurations oriented 45 degrees in rotation from each other. The resistive elements within the Wheatstone bridge configurations may be formed from Permalloy material. In such examples, the resistance of each of the resistive elements may vary according to a $\cos^2(\theta)$ relationship where $\theta$ is the angle between the magnetic moment vector of the resistive element and the current flowing through the resistive element. Such an AMR device may be able to produce a first output voltage that varies according to a $\sin(2\theta)$ relationship and a second output voltage that varies according to a $\cos(2\theta)$ relationship. The first and second output voltages may be used to determine an angular position of a magnetic field incident on the AMR device. Because the $\sin(2\theta)$ function and the $\cos(2\theta)$ function are periodic functions each with a period of 180 degrees, such an AMR device is not able to provide a unique output voltage value for each rotational angle of an incident magnetic field within a range of 360 degrees.

SUMMARY

This disclosure is directed to techniques for magnetic field angular position sensing. The techniques may involve the use of a magnetic field angular position sensor and two polarity detectors. The magnetic field angular position sensor may be configured to generate a first signal indicative of the angular position of an incident magnetic field. The two polarity detectors may be positioned in two different locations to generate signals indicative of the polarity of the incident magnetic field at each of the two different locations. The signals generated by the polarity detectors may be used in combination with the first signal generated by the magnetic field angular position sensor to generate a second signal indicative of the angular position of the incident magnetic field. The second signal indicative of the angular position of the incident magnetic field may have an angular range that is greater than that of the first signal indicative of the angular position of the incident magnetic field. In this manner, the techniques of this disclosure may provide an angular position sensing signal with an increased angular range relative to that which is generated by the magnetic field angular position sensor itself.

In some examples, the magnetic field angular position sensor may be an anisotropic magnetoresistive (AMR) sensor configured to generate a first signal indicative of the angular position of a magnetic field such that the first signal has an angular range of 180 degrees and the polarity detectors may be Hall sensors. In such examples, the polarity information generated by the Hall sensors may be used in combination with the first signal indicative of the angular position of the magnetic field to generate a second signal indicative of the angular position of the magnetic field that has an angular range of 360 degrees. In this manner, the techniques of this disclosure may provide a magnetic field angular position sensing signal having a 360 degree range based on an AMR angular position sensing signal that has an angular range of 180 degrees.

According to one example, a device includes a magnetoresistive sensor configured to generate a signal indicative of an angular position of a magnetic field, the signal having an angular range of 180 degrees. The device further includes a first polarity sensor configured to generate a signal indicative of a polarity of the magnetic field sensed from a first location. The device further includes a second polarity sensor configured to generate a signal indicative of a polarity of the magnetic field sensed from a second location different from the first location.

According to another example, a method includes generating, with a magnetoresistive sensor, a signal indicative of an angular position of a magnetic field, the signal having an angular range of 180 degrees. The method further includes generating a signal indicative of a polarity of the magnetic field sensed from a first location. The further includes generating a signal indicative of a polarity of the magnetic field sensed from a second location different from the first location.

According to another example, a device includes a decoder device configured to generate a decoded signal indicative of the angular position of a magnetic field based on a signal indicative of the angular position of the magnetic field having an angular range of 180 degrees, a signal indicative of the polarity of the magnetic field sensed from the first location, and a signal indicative of the polarity of the magnetic field sensed from the second location, the decoded signal having an angular range of 360 degrees.

According to another example, a system includes a sensor device that includes a magnetoresistive sensor configured to generate a signal indicative of an angular position of a magnetic field, the signal having an angular range of 180 degrees. The sensor device further includes a first polarity sensor configured to generate a signal indicative of a polarity of the magnetic field sensed from a first location. The sensor device further includes a second polarity sensor configured to generate a signal indicative of a polarity of the magnetic field sensed from a second location different from the first location. The system further includes a decoder configured to generate a decoded signal indicative of the angular position of a magnetic field based on the signal indicative of the angular position of the magnetic field, the signal indicative of the polarity of the magnetic field sensed from the first location, and the signal indicative of the polarity of the magnetic field sensed from the second location, the decoded signal having an angular range of 360 degrees.

The details of one or more examples are set forth in the accompanying drawings and the description below. Other features, objects, and advantages will be apparent from the description and drawings, and from the claims.

DETAILED DESCRIPTION

Figure 1:
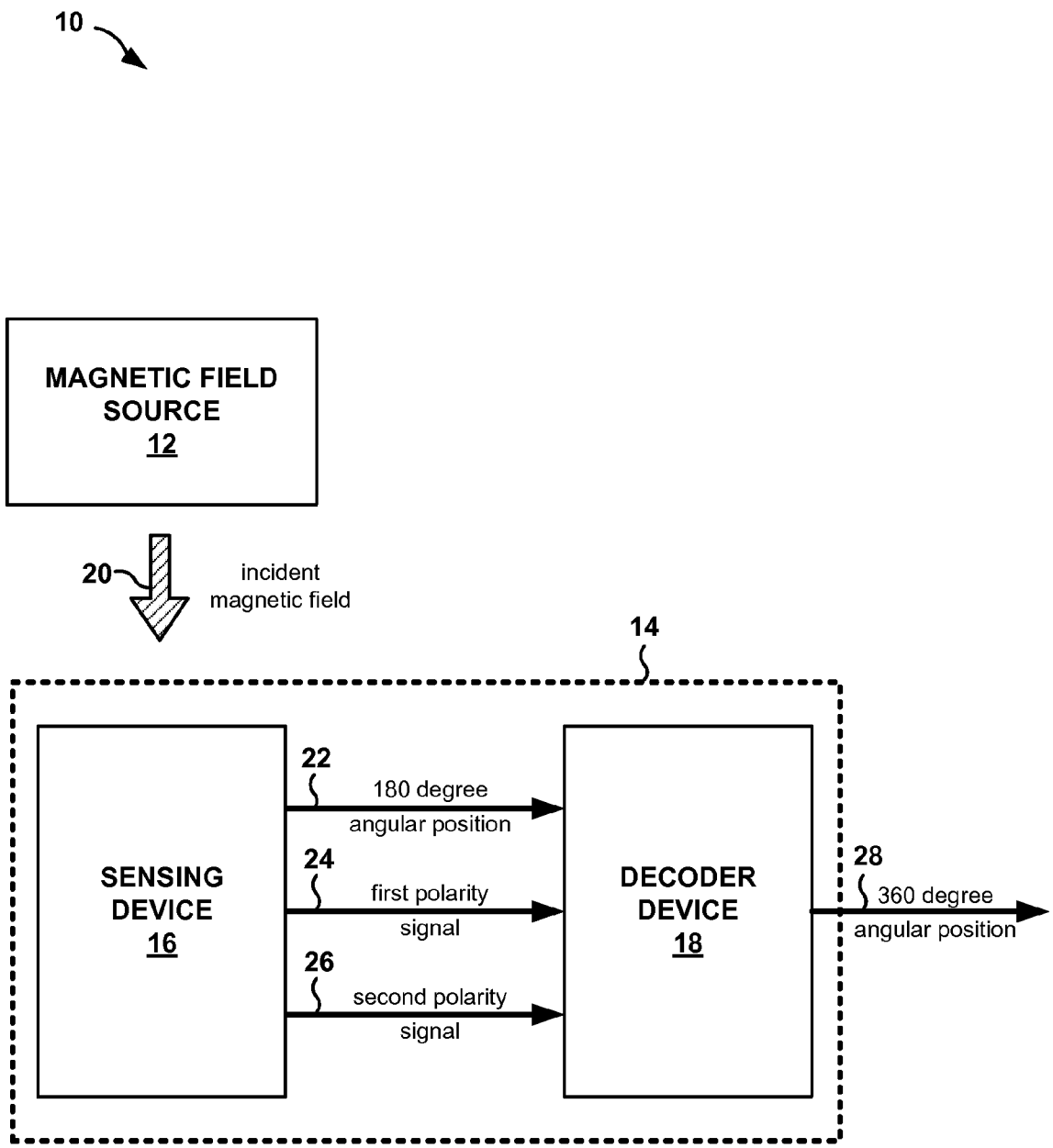
FIG. 1 is a block diagram illustrating an example magnetic field angular position sensing system according to this disclosure.

This disclosure is directed to techniques for magnetic field angular position sensing. The techniques may involve the use of a magnetic field angular position sensor and two polarity detectors. The magnetic field angular position sensor may be configured to generate a first signal indicative of the angular position of an incident magnetic field. The two polarity detectors may be positioned in two different locations to generate signals indicative of the polarity of the incident magnetic field at each of the two different locations. The signals generated by the polarity detectors may be used in combination with the first signal generated by the magnetic field angular position sensor to generate a second signal indicative of the angular position of the incident magnetic field. The second signal indicative of the angular position of the incident magnetic field may have an angular range that is greater than that of the first signal indicative of the angular position of the incident magnetic field. In this manner, the techniques of this disclosure may provide an angular position sensing signal with an increased angular range relative to that which is generated by the magnetic field angular position sensor itself.

An anisotropic magnetoresistive (AMR) sensor that includes two Wheatstone bridge configurations oriented 45 degrees in rotation from each other may provide magnetic field angular position sensing of an incident magnetic field within a measurement range of 180 degrees. For some types of angular position sensing applications, it may be desirable to have an angular measurement range of 360 degrees rather than 180 degrees. For example, it may be desirable to provide a 360 degree angular measurement range when sensing the angular position of a rotating shaft, such as, e.g., a steering wheel.

For applications where a 360 degree angular measurement range is desired, the 180 degree angular measurement range provided by the AMR sensor described above may not be sufficient to discriminate the angular position of the incident magnetic field. For example, an output value produced by the AMR sensor that corresponds to 30 degrees within a 180 degree angular measurement range may correspond to either 30 degrees or 210 degrees within a 360 degree angular measurement range. Thus, such a sensor is not able to discriminate in which half of a 360 angular spectrum the incident magnetic field is positioned.

One solution to this problem is to use a Hall effect sensor to sense the polarity of the incident magnetic field. The Hall effect sensor may be positioned in a location where the incident magnetic field includes directional components that are perpendicular to the plane of rotation of the source magnet that generates the incident magnetic field. When positioned in such a manner, the Hall effect sensor may provide information as to which half-spectrum of the 360 degree angular spectrum the incident magnetic field is positioned. This information may be used in conjunction with the output value of the AMR sensor to determine an output value corresponding to a 360 angular position.

Due to magnetic parameter variations, such as operate and release variations in the Hall effect sensor, the transition angles between the first half-phase and the second half-phase of the 360 degree angular spectrum may vary within a transition range. For example, assume the first half-phase is defined to include all angles, $\theta$, for $0 \leq \theta < 180$ degrees and the second half-phase is to include all angles, $\theta$, for $180 \leq \theta < 360$ degrees. In such an example, variations in the transitions of the Hall effect sensor signal may cause an incorrect half-phase determination at angles proximate to the transition angles of 0, 180 and 360 degrees. For example, if the incident magnetic field is positioned at 179 degrees, an error in the output of the Hall effect sensor could cause the detected angular position of the AMR-Hall system to be 359 degrees rather than 179 degrees. Thus, a system that includes a 180 degree AMR sensor and a single Hall sensor may not be able to produce accurate 360 degree angular sensing for angles proximate to the transitions between the half-phases of a 360 degree angular spectrum.

According to this disclosure, a magnetic field sensing device may include a 180 degree AMR sensor and two Hall sensors positioned in different locations with respect to each other. A second Hall sensor may provide additional information regarding the half-phase in which the magnetic field is positioned. The additional information provided by the second Hall sensor may be use to prevent errors from occurring near the transition angles associated with the first Hall sensor. In this manner, a robust 360 degree angular position signal may be generated based on an AMR angular position sensing signal that has an angular range of 180 degrees.

FIG. 1 is a block diagram illustrating an example magnetic field angular position sensing system 10 according to this disclosure. Magnetic field angular position sensing system 10 is configured to generate a signal 28 indicative of the angular position of magnetic field source 12. Magnetic field angular position sensing system 10 includes a magnetic field source 12 and a sensing subsystem 14. Magnetic field source 12 is magnetically coupled to sensing subsystem 14 via incident magnetic field 20.

Magnetic field source 12 is configured to generate an incident magnetic field 20. Magnetic field source 12 may be rotatable about an axis of rotation. As magnetic field source 12 rotates around the axis of rotation, the angular position of incident magnetic field 20 also rotates. Thus, the angular position of incident magnetic field 20 may be indicative of the angular position of magnetic field source 12. In particular, each angular position of incident magnetic field 20 may correspond to an angular position of magnetic field source 12. In some examples, the axis of rotation of incident magnetic field 20 may be the same axis of rotation as that of magnetic field source 12.

In some examples, magnetic field source 12 may be rotatably positioned at any angle within a 360 degree angular spectrum. In other words, in such examples, magnetic field source 12 may be able to rotate in a complete circle about the axis of rotation of magnetic field source 12. In such examples, incident magnetic field 20 may also rotate through a 360 degree angular spectrum.

Magnetic field source 12 may be formed from any type of magnetic source configured to generate incident magnetic field 20. In some examples, magnetic field source 12 may be a bar magnet, cylindrical magnet, ring magnet, or any other type of device configured to generate a magnetic field. In further examples, the incident magnetic field 20 generated by magnetic field source 12 may be of sufficient strength to saturate a magnetoresistive angular position sensor contained within sensing subsystem 14. In further examples, the strength of incident magnetic field 20 may be approximately equal to 100 G or greater.

Sensing subsystem 14 is configured to receive incident magnetic field 20 and to generate a decoded angular position signal 28. In some examples, decoded angular position signal 28 may have an angular spectrum that is substantially equal to the angular spectrum of incident magnetic field 20. In further examples, decoded angular position signal 28 may have an angular spectrum equal to 360 degrees. In additional examples, decoded angular position signal 28 may vary with respect to incident magnetic field 20 according to a substantially linear function over a 360 degree spectrum. In other words, in such examples, the slope of a function having incident magnetic field 20 as the input value and decoded angular position signal 28 as the output value may be substantially constant for any angular position within a 360 degree spectrum.

Sensing subsystem 14 includes a sensing device 16 and a decoder device 18. Sensing device 16 is communicatively coupled to decoder device 18. Sensing device 16 is configured to sense incident magnetic field 20 and to generate an angular position signal 22, a polarity signal 24 and a polarity signal 26 based on sensed magnetic field 20. The three signals generated by sensing device 16 may together be indicative of the angular position of incident magnetic field 20 within a 360 degree spectrum.

In some examples, the angular position of incident magnetic field 20 may correspond to the angular position of components of incident magnetic field 20 that are parallel to a plane of sensitivity of sensing device 16. The plane of sensitivity may, in some examples, correspond to the plane of sensitivity of a magnetoresistive device contained within sensing device 16, e.g., the plane defined by a Wheatstone bridge configuration within the magnetoresistive device. In further examples, a fixed angle may be defined for sensing device 16 within the plane of sensitivity and the angular position of incident magnetic field 20 may be the angular position of incident magnetic field 20 relative to the fixed angle.

Sensing device 16 may generate angular position signal 22 such that angular position signal 22 varies with respect to incident magnetic field 20 according to a periodic function. For example, angular position signal 22 may vary with respect to incident magnetic field 20 according to a sinusoidal function. As used herein, a sinusoidal function may refer to a function that oscillates like a sine function or a cosine function with respect to the angular position of incident magnetic field 20. The sine function or cosine function may be shifted, stretched, compressed, squared, etc. The period of the periodic function, in some examples, may be equal to 180 degrees.

In some examples, angular position signal 22 may vary according to a $\cos^2(\theta)$ function where $\theta$ is the angular position of incident magnetic field 20. In further examples, angular position signal 22 may comprise two separate signals. The first signal may vary according to a $\sin(2\theta)$ relationship and the second signal may vary according to a $\cos(2\theta)$ relationship. The first signal and the second signal may together be indicative of the angular position of incident magnetic field 20 within a 180 degree range.

Each of polarity signal 24 and polarity signal 26 may be a signal that is capable of indicating a polarity of incident magnetic field 20 at a particular location of sensitivity. The polarity of incident magnetic field 20 may, in some examples, refer to the polarity of a directional component of incident magnetic field 20 at the location of sensitivity. The directional component may, for example, be a directional component that is substantially perpendicular to the plane of sensitivity of sensing device 16 at the location of sensitivity. The location of sensitivity for polarity signal 24 may be different from the location of sensitivity of polarity signal 26.

Polarity signal 24 and polarity signal 26 may together provide quadrant information to decoder device 18. In some examples, the quadrant information may be indicative of an approximate quadrant within a 360 angular spectrum in which incident magnetic field 20 is positioned. In some examples, the quadrants may be overlapping quadrants. In further examples, the quadrant information may be indicative of a quadrant in which incident magnetic field 20 is not positioned.

In some examples, one or both of polarity signal 26 and decoded angular position signal 28 may be digital signals, e.g., a digital bit, indicative of the polarity of incident magnetic field 20. In further examples, one or both of polarity signal 24 and polarity signal 26 may be analog signals indicative of the polarity of incident magnetic field 20. When polarity signals 24 and 26 are analog signals, a predetermined threshold together with the analog signal may together indicate the polarity of incident magnetic field 20. For example, an analog value of polarity signal 24 greater than a first threshold may be indicative of a first polarity and an analog signal less than or equal to the first threshold may be indicative of the second polarity.

Sensing device 16 may contain one or more magnetic field sensors configured to generate angular position signal 22, polarity signal 24 and polarity signal 26. In some examples, the one or more magnetic field sensors may be affixed or attached to a common substrate.

Decoder device 18 is configured to receive angular position signal 22, polarity signal 24 and polarity signal 26 and to generate decoded angular position signal 28 based on angular position signal 22, polarity signal 24 and polarity signal 26. Decoded angular position signal 28 may be a signal indicative of the angular position of incident magnetic field 20 within a 360 degree spectrum.

Decoder device 18 may generate decoded angular position signal 28 at least in part by implementing a two-input arctangent function based on angular position signal 22, polarity signal 24 and polarity signal 26. In some examples, decoder device 18 may implement a digital two-input arctangent function. In such examples, decoder device 18 may be referred to herein as a digital decoder device 18. When implementing a digital two-input arctangent function, decoder device 18 may use sequential circuit elements to implement the two-input arctangent function. As used herein, sequential circuit elements refer to circuit elements that retain a particular state after the inputs to the circuit elements are unasserted. For example, decoder device 18 may use a look-up table stored within a memory or register bank to implement the two-input arctangent function.

In further examples, decoder device 18 may implement an analog two-input arctangent function. In such examples, decoder device 18 may be referred to herein as an analog decoder device 18. When implementing an analog two-input arctangent function, decoder device 18 may use non-sequential circuit elements to implement the two-input arctangent function. As used herein, non-sequential circuit elements refer to circuit elements that do not retain a particular state after the inputs to the circuit elements are unasserted. For example, decoder device 18 may use combinational circuit elements to implement the two-input arctangent function.

Figure 2:
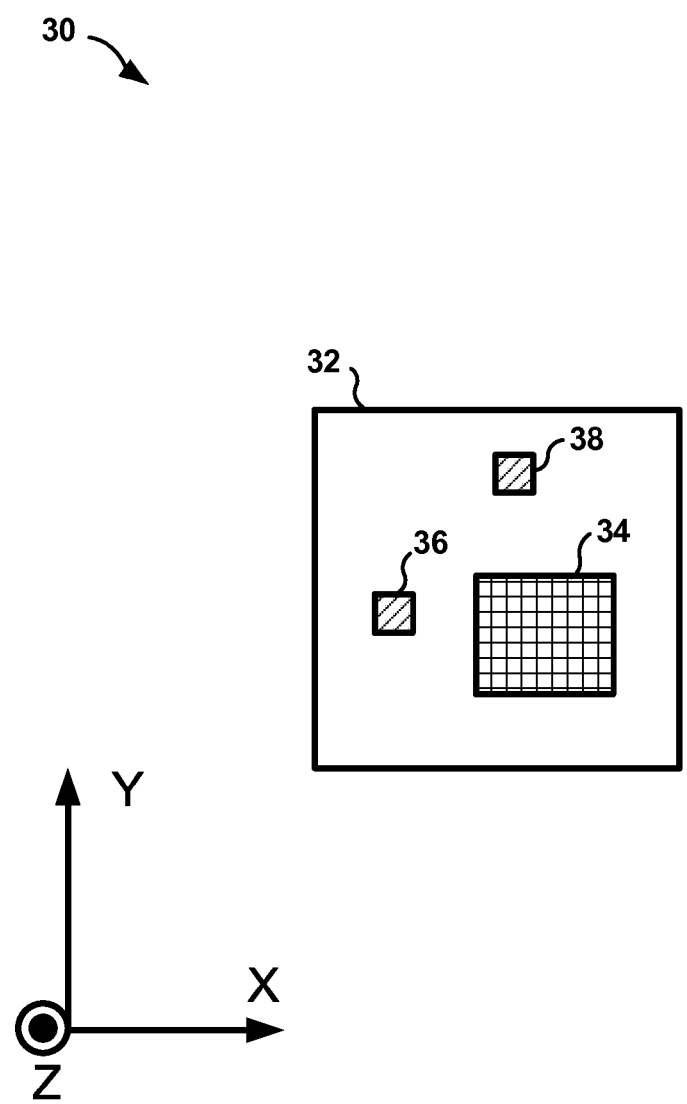
FIG. 2 is a top view of an example sensing device according to this disclosure.

FIG. 2 is a top view of an example sensing device 30 according to this disclosure. Sensing device 30 is configured to generate angular position signal 22, polarity signal 24, and polarity signal 26 based on an angular position of incident magnetic field 20. In some examples, sensing device 30 may correspond to sensing device 16 of FIG. 1. Sensing device 30 includes a substrate 32, an angular position sensor 34 and polarity detectors 36 and 38. One or more of angular position sensor 34, polarity detector 36 and polarity detector 38 may be attached or affixed to substrate 32.

The axes in FIG. 2 depict an x-axis extending from left to right and a y-axis extending from bottom to top. The circle with the dot in the center depicts that the z-axis extends out of the page toward the viewer.

Angular position sensor 34 is configured to sense incident magnetic field 20 and to generate angular position signal 22 based on incident magnetic field 20. In some examples, angular position sensor 34 may generate angular position signal 22 such that angular position signal 22 is indicative of the angular position of incident magnetic field 20 within a 180 degree measurement range.

In further examples, angular position sensor 34 may be a magnetoresistive sensor. The magnetoresistive sensor may include two Wheatstone bridge configurations oriented 45 degrees in rotation from each other.

In some examples, each Wheatstone bridge configuration may include four resistive elements, two bias nodes and two measurement nodes. A first resistive element may be electrically coupled between a first bias node and a first measurement node. A second resistive element may be electrically coupled between the first measurement node and a second bias node. A third resistive element may be electrically coupled between the first bias node and a second measurement node. A fourth resistive element may be electrically coupled between the second measurement node and the first bias node. In such a configuration, in order to generate angular position signal 22, angular position sensor 34 may apply a bias voltage between the first and second bias voltage nodes, and measure the resulting voltage across the first and second measurement nodes to produce a measured voltage.

One or more of the resistive elements within the Wheatstone bridge configuration may include magnetoresistive material. Magnetoresistive material may be a material having a property where the electrical resistance of the material changes when an external magnetic field is applied to the material, when the magnitude of the applied external magnetic field changes and/or when the direction of the external magnetic field changes. In some examples, the resistance of each of the resistive elements may vary according to a $\cos^2(\theta)$ relationship where $\theta$ is the angle between the magnetic moment vector of the resistive element and the current flow through the resistive element. For example, the magnetoresistive material may be formed from or include Permalloy material.

When two Wheatstone bridge configurations are oriented 45 degrees in rotation from each other, a first measured voltage received from the first Wheatstone bridge configuration may vary according to a first periodic function applied to the angular position of incident magnetic field 20, and a second measured voltage received from the second Wheatstone bridge configuration may vary according to a second periodic function applied to the angular position of incident magnetic field 20. In some examples, the first and second periodic functions may each have a period of 180 degrees. In further examples, the first and second periodic functions may be sinusoidal functions. The first and second sinusoidal functions may be, in some examples, the same sinusoidal function, but the first sinusoidal function may be phase-shifted by 90 degrees with respect to the second sinusoidal function. In further examples, the first sinusoidal function may include a $\sin(2\theta)$ term where $\theta$ is the angle between incident magnetic field 20 and a fixed angle within the sensing plane of angular position sensor 34, and the second sinusoidal function may include a $\cos(2\theta)$ term where $\theta$ is the angle between incident magnetic field 20 and the fixed angle. In such examples, the first sinusoidal function and the second sinusoidal functions may include other scaling factors or constants in addition to the $\sin(2\theta)$ and $\cos(2\theta)$ terms. The first and second measured voltages may together be indicative of an angular position of incident magnetic field 20 within a 180 degree measurement range.

The example angular position sensor 34 described above is just one example of an angular position sensor 34 capable of being used with this disclosure. In further examples, angular position sensor 34 may take the form of an APS00B sensing chip available from Honeywell International, Inc. Other examples of magnetic field sensors capable of generating a signal indicative of a magnetic field may be used in place of angular position sensor 34 as will be apparent to a person of ordinary skill in the art.

As shown in the example sensing device 30 of FIG. 2, polarity detector 36 is positioned in a first location and polarity detector 38 is positioned in a second location. Polarity detector 36 is configured to sense incident magnetic field 20 from the first location and to generate polarity signal 24. Similarly, polarity detector 38 is configured to sense incident magnetic field 20 from the second location and to generate polarity signal 26. In some examples, the first and second locations may be selected such that polarity detector 36 and polarity detector 38 generate quadrant information indicating in which of a plurality of overlapping quadrants incident magnetic field 20 is positioned. In further examples, the first and second locations may be selected such that polarity detector 36 and polarity detector 38 are positioned in a quadrature configuration as will be described in further detail in this disclosure. In additional examples, angular position sensor 34, polarity detector 36 and polarity detector 38 may be coplanar.

In some examples, one or more of polarity detector 36 and polarity detector 38 may be Hall sensors. In some examples, a Hall sensor may use the Hall effect or Lorentz force as a principle of operation. For example, such a sensor may include a semiconductor slab having two bias electrodes and two measurement electrodes. In some examples, the two bias electrodes may be positioned on sides of the slab opposite each other and the two measurement electrodes may be positioned on sides of the slab that are in between the sides of the slab where the bias electrodes are positioned. A bias current may be applied through the semiconductor slab between the bias electrodes, e.g., by applying a voltage between the bias electrodes of the slab. When an incident magnetic field applied to the slab, the Lorentz force causes the charge carriers to be deflected in a direction perpendicular to the direction of current flow and the applied magnetic field. The deflected charge carriers generate a voltage across the sides of the slab where the measurement electrodes are positioned that is sufficient to counteract the Lorentz force. The voltage across the measurement electrodes (i.e., the Hall voltage) may be indicative of the magnetic field strength of the applied magnetic field.

More specifically, the voltage across the measurement electrodes may be indicative of the strength of a directional component of the applied magnetic field. The directional component of the applied magnetic field may correspond to a directional component that is perpendicular to the direction of the applied current and the direction of the Lorentz force. In cases where the semiconductor substrate is substantially planar, the directional component of the applied magnetic field sensed by the Hall sensor may be the directional component that is perpendicular to the planar semiconductor substrate. The directional component indicated by the measured voltage may be referred to herein as the direction of sensitivity of the Hall sensor.

In some examples, the Hall sensor may output the measured voltage to generate an analog signal. The analog signal may be indicative of the polarity of a directional component of the applied magnetic field, e.g., the directional component that is parallel with the direction of sensitivity of the Hall sensor. For example, an analog measured voltage signal that is greater than zero may be indicative of a first polarity or direction of the directional component of the applied magnetic field. Similarly, an analog measured voltage signal that is less than or equal to zero may be indicative of a second polarity or direction of the directional component of the applied magnetic field.

In additional examples, the Hall sensor may convert the analog measured voltage signal to a digital signal and output the digital signal. For example, the Hall sensor may include an analog-to-digital converter, such as, e.g., a comparator that compares the analog measured voltage value to a threshold voltage value and generates a digital output value based on the comparison. The threshold value may be, in some examples, equal to zero volts although other thresholds are possible. The digital signal may be indicative of the polarity of a directional component of the applied magnetic field. For example, the digital signal may include two digital states with a first digital state indicative of a first polarity or direction of the directional component of the applied magnetic field and a second digital state indicative of a second polarity or direction of the directional component of the applied magnetic field.

In some examples, polarity detector 36 may include a planar substrate. In such examples, polarity detector 36 may sense a directional component of incident magnetic field 20 that is perpendicular to the planar substrate of polarity detector 36, and generate polarity signal 24 such that polarity signal 24 is indicative of the polarity or direction of the sensed directional component of incident magnetic field 20. Similarly, polarity detector 38 may, in further examples, include a planar substrate. In such examples, polarity detector 38 may sense a directional component of incident magnetic field 20 that is perpendicular to the planar substrate of polarity detector 38, and generate polarity signal 26 such that polarity signal 26 is indicative of the polarity or direction of the sensed directional component of incident magnetic field 20.

The example Hall sensor described above is just one example of a polarity detector 36 capable of being used with this disclosure. In further examples, one or both of polarity detector 36 and polarity detector 38 may take the form of an SS495A sensing chip available from Honeywell International, Inc. Other examples of magnetic field sensors capable of generating a signal indicative of a magnetic field may be used in place of polarity detector 36 and/or polarity detector 38 as will be apparent to a person of ordinary skill in the art.

Figure 3:
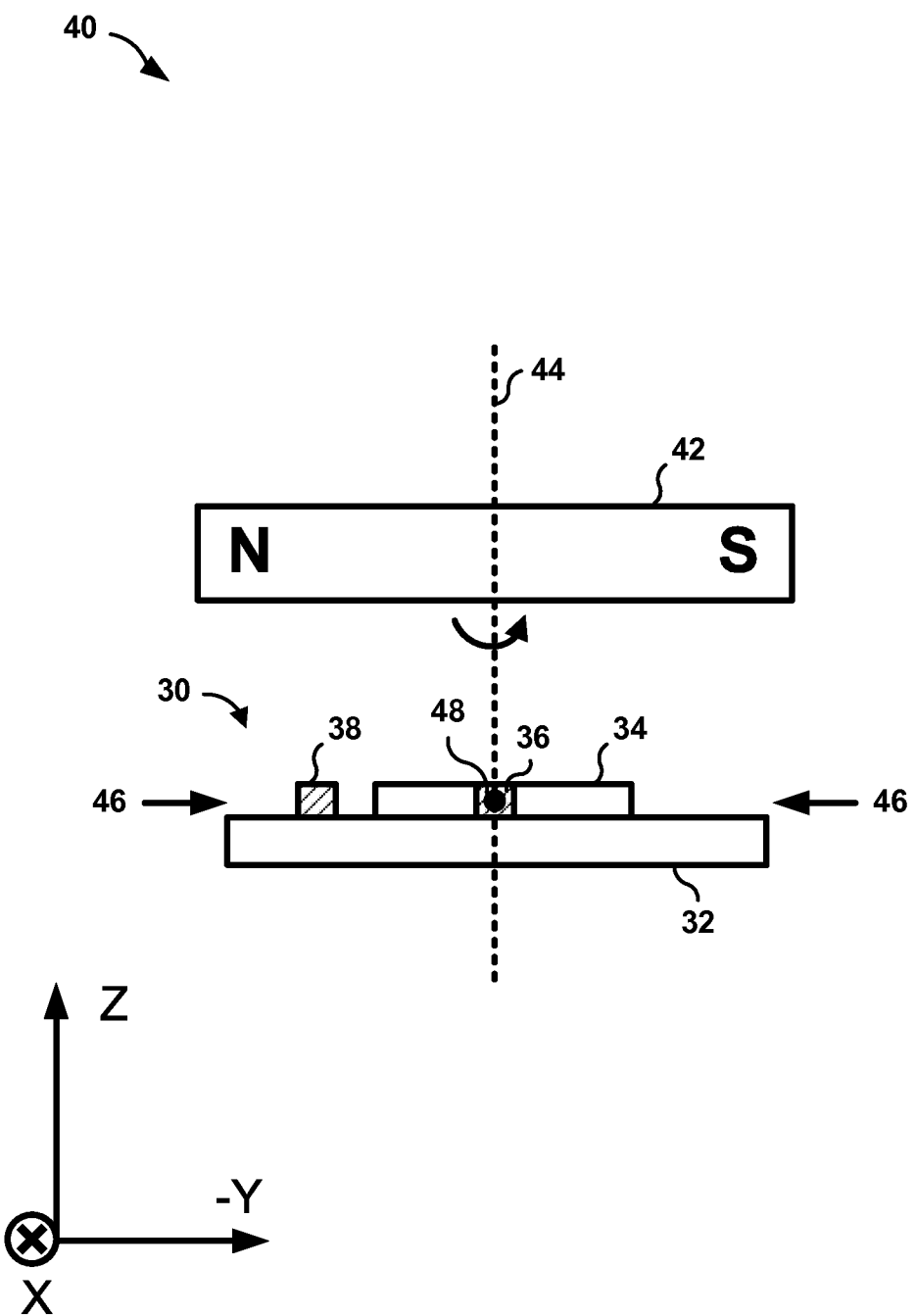
FIG. 3 is a conceptual diagram illustrating a side view of an example sensing configuration according to this disclosure.

FIG. 3 is a conceptual diagram illustrating a side view 40 of an example sensing configuration for the sensing device 30 of FIG. 2 according to this disclosure. In some examples, magnet 42 may correspond to magnetic field source 12 illustrated in FIG. 1. In further examples, sensing device 30 may correspond to sensing device 16 illustrated in FIG. 1.

The axes in FIG. 3 depict a y-axis extending in the negative direction from left to right and a z-axis extending in the positive direction from bottom to top. The circle with the "x" in the center depicts that the x-axis extends into the page away from the viewer.

One or more of magnet 42 and sensing device 30 may be configured to rotate about axis 44. In some examples, magnet 42 may be configured to rotate about axis 44, and sensing device 30 may be configured to remain stationary. In additional examples, sensing device 30 may be configured to rotate about axis 44, and sensing device 30 may be configured to remain stationary. In further examples, magnet 42 and sensing device 30 may both be configured to rotate about axis 44. In each of these cases, magnet 42 may be said to rotate relative to sensing device 30, and the magnetic field generated by magnet 42 may be said to rotate relative to sensing device 30. The magnetic field generated by magnet 42 may correspond, in some examples, to incident magnetic field 20 illustrated in FIG. 1.

Axis 44 may correspond to the axis of rotation of the magnetic field generated by magnet 42. The axis of rotation of the magnetic field generated by magnet 42 may alternatively be referred to as the axis of rotation of the magnetic field generated by magnet 42 relative to sensing device 30. In examples where magnet 42 rotates, the axis of rotation of the magnetic field may correspond to the axis of rotation of magnet 42. In examples where magnet 42 is stationary and sensing device 30 rotates, the axis of rotation of the magnetic field may correspond to the axis of rotation of sensing device 30. The axis of rotation of sensing device 30 may refer to the axis of rotation of substrate 32 and/or to the axis of rotation of a polarity detector sensing plane 46.

Polarity detector sensing plane 46 may be defined as a plane perpendicular to axis 44 that includes polarity detector 36 and polarity detector 38. In cases where polarity detector 36 and polarity detector 38 are Hall sensors, polarity detector sensing plane 46 may be referred to as a Hall sensor sensing plane 46. As shown in FIG. 3, the intersection of axis 44 and polarity detector sensing plane 46 may form a vertex 48, which will be described in further detail in FIG. 4.

As shown in example configuration of FIG. 3, the plane of sensitivity of angular position sensor 34 is substantially parallel to polarity detector sensing plane 46, and more particularly, polarity detector sensing plane 46 includes angular position sensor 34 in addition to polarity detector 36 and polarity detector 38. However, in other examples, angular position sensor 34 may not be included in polarity detector sensing plane 46 and/or the plane of sensitivity of angular position sensor 34 may not be parallel to polarity detector sensing plane 46.

As also shown in example configuration of FIG. 3, the direction of the magnetic dipole of magnet 42 is parallel to polarity detector sensing plane 46 and perpendicular to axis 44. The direction of the magnetic dipole of magnet 42 may be defined as a vector starting at the north pole of magnet 42 and extending toward the south pole of magnet 42. However, in other examples, the direction of the magnetic dipole magnet 42 may not be parallel to polarity detector sensing plane 46 and/or the direction of the magnetic dipole magnet 42 may not be perpendicular to axis 44.

Figure 4:
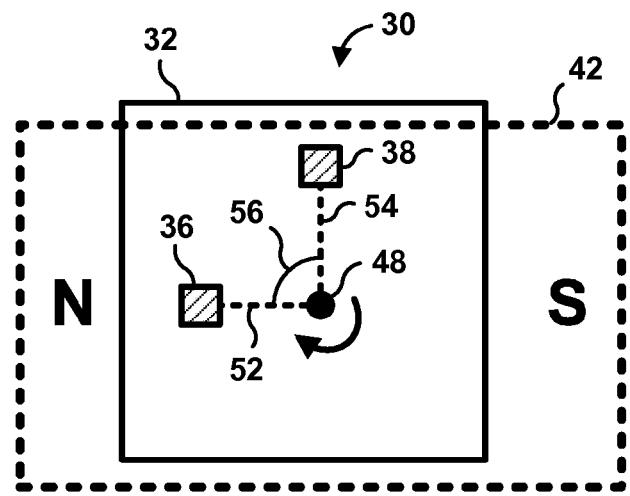
FIG. 4 is a conceptual diagram illustrating a top view of the example sensing configuration of FIG. 3 according to this disclosure.
Figure 4:
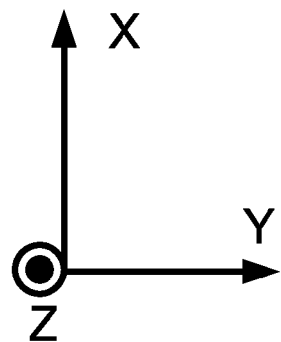

FIG. 4 is a conceptual diagram illustrating a top view 50 of the example sensing configuration of FIG. 3 according to this disclosure. The axes in FIG. 4 are substantially similar to the axes in FIG. 2. Although sensing device 30 does include an angular position sensor 34, for ease of illustration of the concepts of FIG. 4, angular position sensor 34 is not shown.

Vertex 48 corresponds to vertex 48 shown in FIG. 3 and is defined at the location where the axis of rotation of the magnetic field intersects polarity detector sensing plane 46. As shown in FIG. 4, a line segment 52 may be defined between vertex 48 and polarity detector 36 and a line segment 54 may be defined between vertex 48 and polarity detector 38. Vertex 48, line segment 52 and line segment 54 may define an angle 56 with vertex 48 being the vertex of the angle 56.

In some examples, polarity detector 36 and polarity detector 38 may be positioned such that the measurement of angle 56 is within a range of approximately 70 degrees to approximately 110 degrees. In further examples, polarity detector 36 and polarity detector 38 may be positioned such that the measurement of angle 56 is substantially equal to 90 degrees. When polarity detector 36 and polarity detector 38 are positioned such that the measurement of angle 56 is substantially equal to 90 degrees, polarity detector 36 and polarity detector 38 may be said to be positioned in a quadrature configuration with respect to an axis of rotation of the magnetic field.

Figure 5:
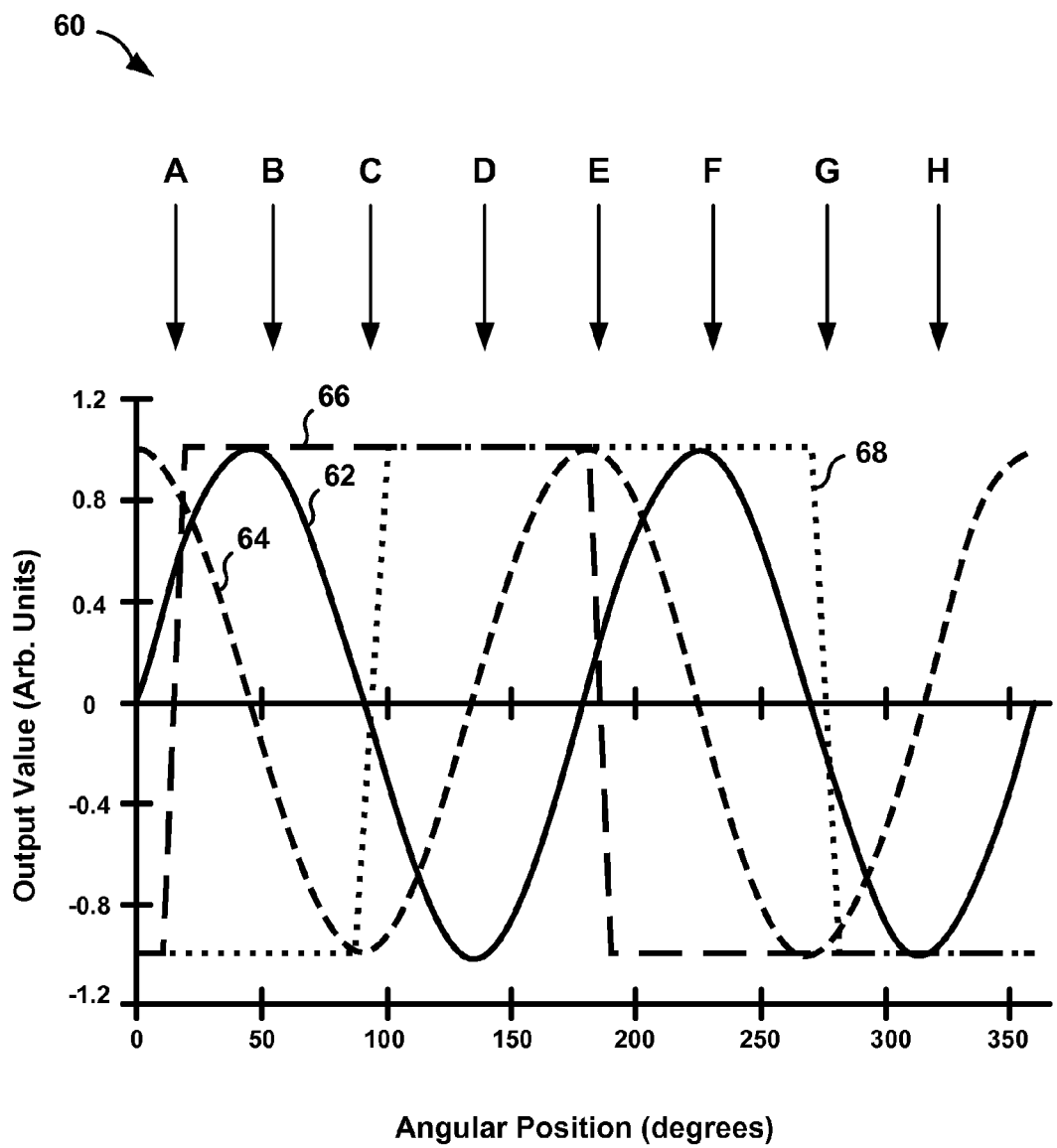
FIG. 5 is a graph illustrating waveforms generated by an example sensing device according to this disclosure.
Figure 5:
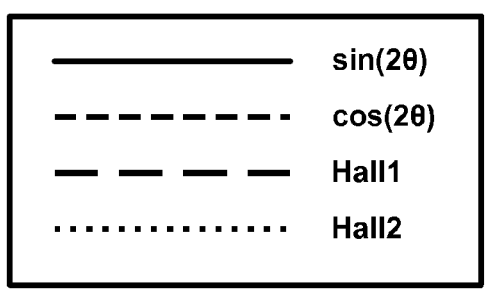

FIG. 5 is a graph 60 illustrating waveforms generated by an example sensing device 16 according to this disclosure. Graph 60 includes an angular position axis in units of degrees and an output value axis in arbitrary units. The angular position axis illustrates an angular spectrum having a range of 360 degrees representing each angle within a 360 rotational spectrum for incident magnetic field 20. Graph 60 includes angular position signals 62 and 64 and half-phase signals 66 and 68.

Angular position signals 62 and 64 may be generated by an angular position sensor 34 and together may form angular position signal 22 in FIG. 1. Angular position signal 62 may be generated by a first Wheatstone bridge configuration of angular position sensor 34, and angular position signal 64 may be generated by a second Wheatstone bridge configuration of angular position sensor 34. The second Wheatstone bridge configuration may be positioned 45 degrees in rotation with respect to the first Wheatstone bridge configuration. In other words, the second Wheatstone bridge configuration may be rotated with respect to the first Wheatstone bridge configuration such that the direction of each of the resistive elements in the second Wheatstone bridge configuration is 45 degrees offset from the direction of a corresponding resistive element in the first Wheatstone bridge configuration. In some examples, the second Wheatstone bridge configuration may also be vertically or horizontally displaced from the first Wheatstone bridge configuration.

The output value of angular position signal 62 and the output value of angular position signal 64 for a given angular position may together be indicative of the angular position of incident magnetic field 20 within an angular range of 180 degrees. An angular position of incident magnetic field 20 within an angular range of 180 degrees may be indicative of two possible angular positions within a 360 degree angular spectrum. For example, if angular position signal 62 indicates an output value approximately −0.9 units and angular position signal 64 indicates an output value of approximately 0.5 units, such a combination of output values may correspond to possible angular positions of approximately 150 degrees and approximately 330 degrees.

Half-phase signal 66 may be generated by polarity detector 36 in FIG. 2 and may correspond to polarity signal 24 in FIG. 1. Similarly, half-phase signal 68 may be generated by polarity detector 38 in FIG. 2 and may correspond to polarity signal 26 in FIG. 1. In the specific example of FIG. 6, half-phase signal 66 and half-phase signal 68 are generated by Hall sensors that produce digital output values. In other examples, however, half-phase signal 66 and half-phase signal 68 may be produced by another type of polarity detector.

The output value of half-phase signal 66 and the output value of half-phase signal 68 for a given angular position may together form quadrant information. In the example shown in FIG. 5, the quadrant information may a two-bit binary value indicative of the quadrant sensed by polarity detector 36 and polarity detector 38. The quadrant information may be used in conjunction with the information provided by angular position signals 62 and 64 to generate a signal indicative of the angular position of incident magnetic field 20 within a 360 degree range.

Figure 6A:
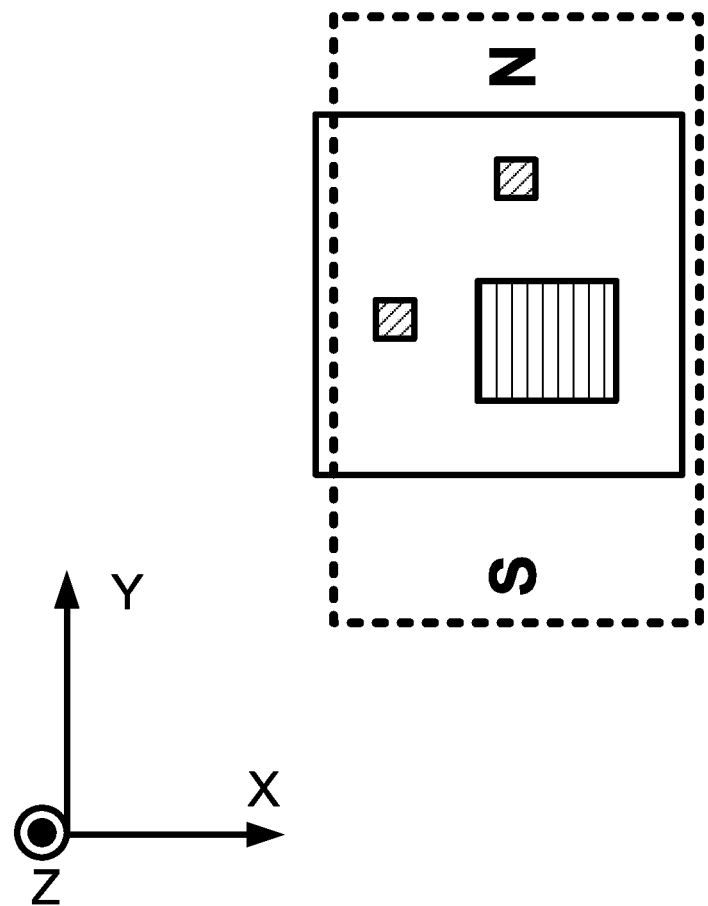
FIGS. 6A-6H are conceptual diagrams illustrating top views of various angular orientations of an example sensing configuration as the magnetic source rotates through a 360 degree angular spectrum according to this disclosure.
Figure 6B:
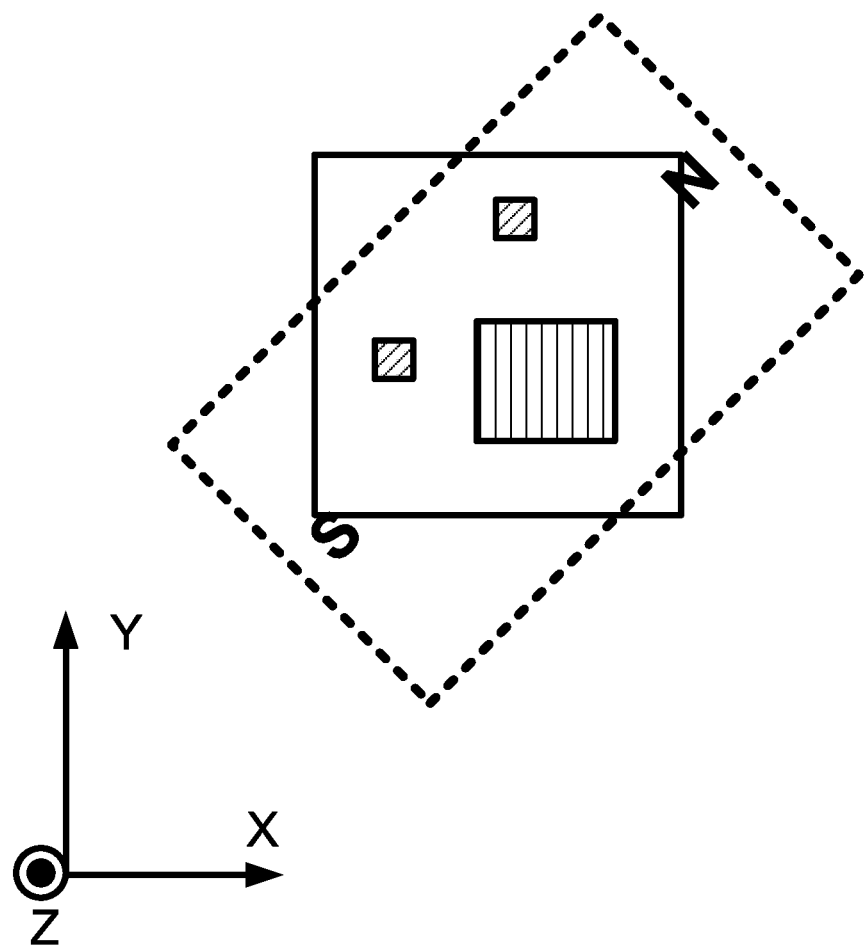
Figure 6C:
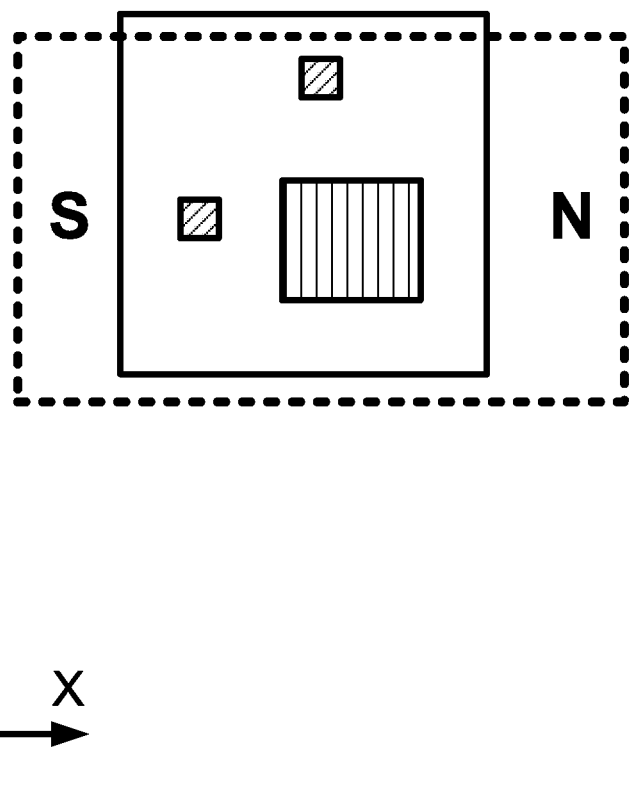
Figure 6D:
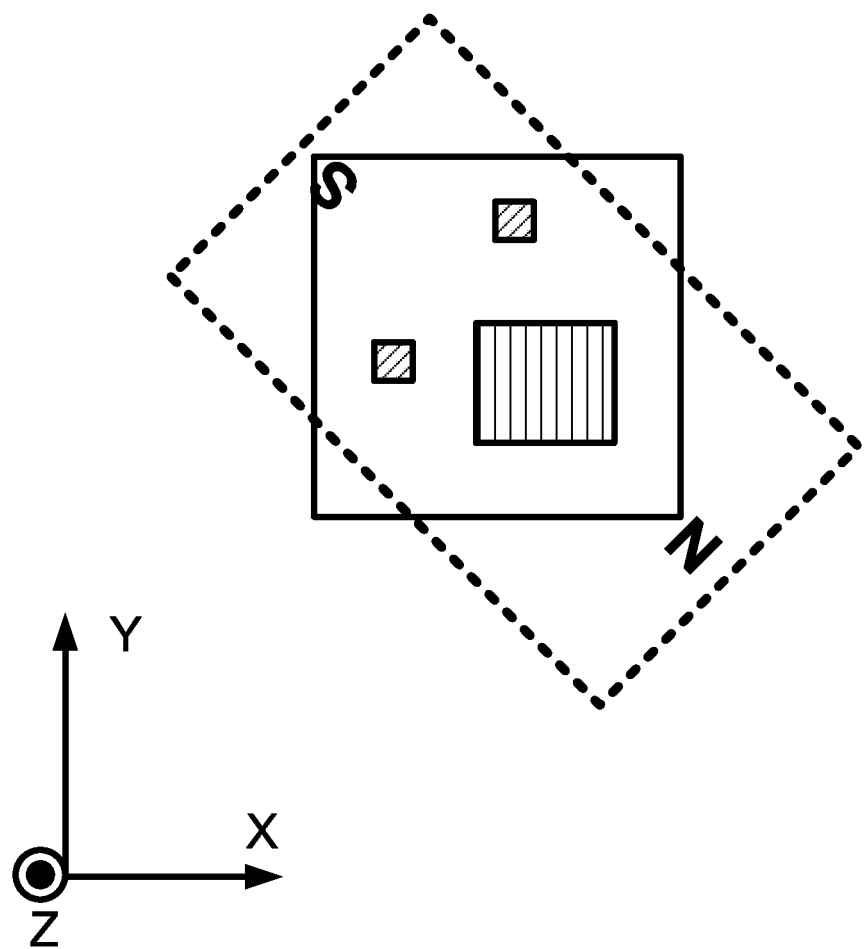
Figure 6E:
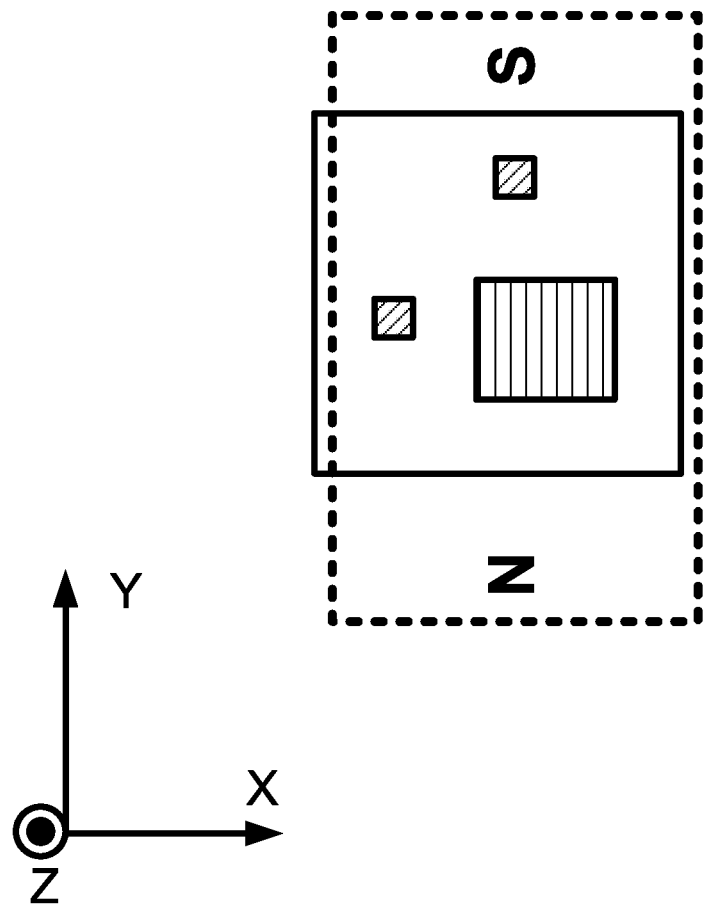
Figure 6F:
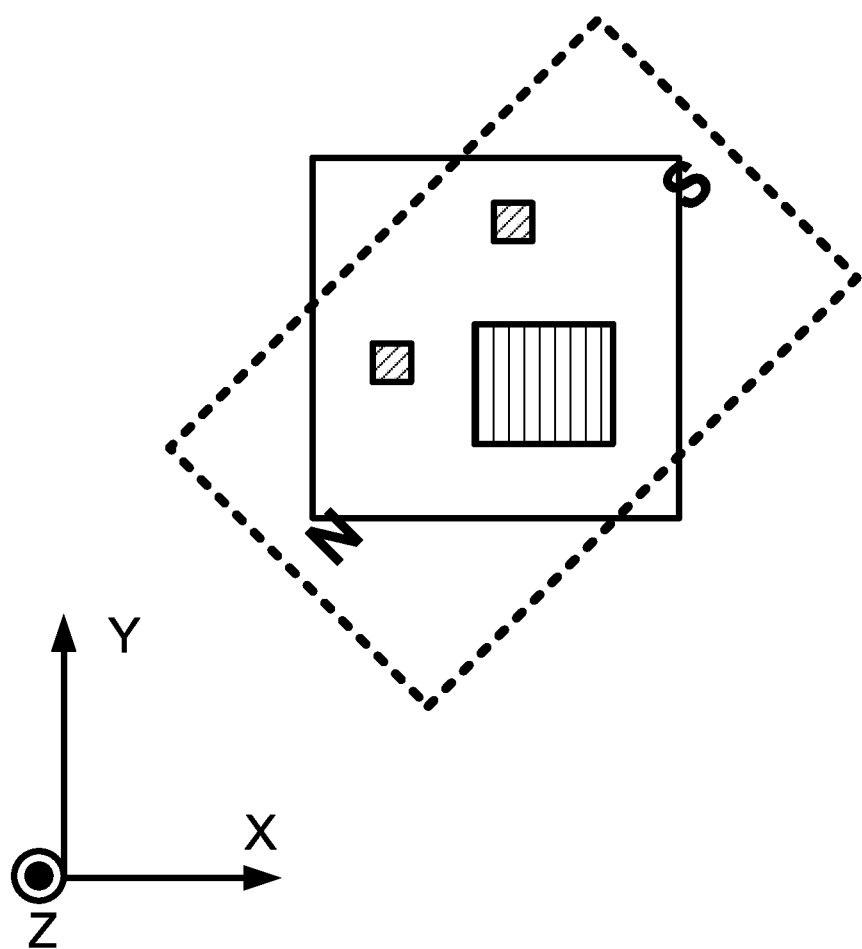
Figure 6G:
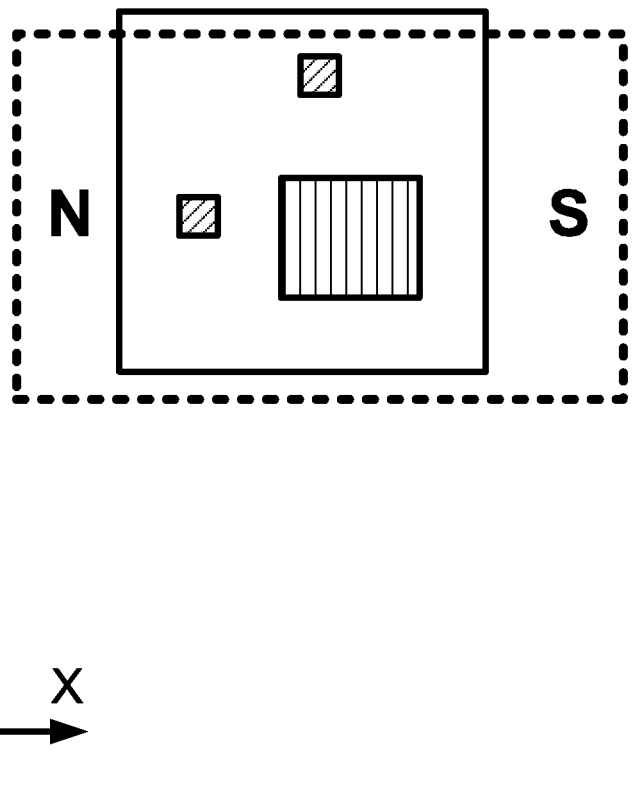
Figure 6H:
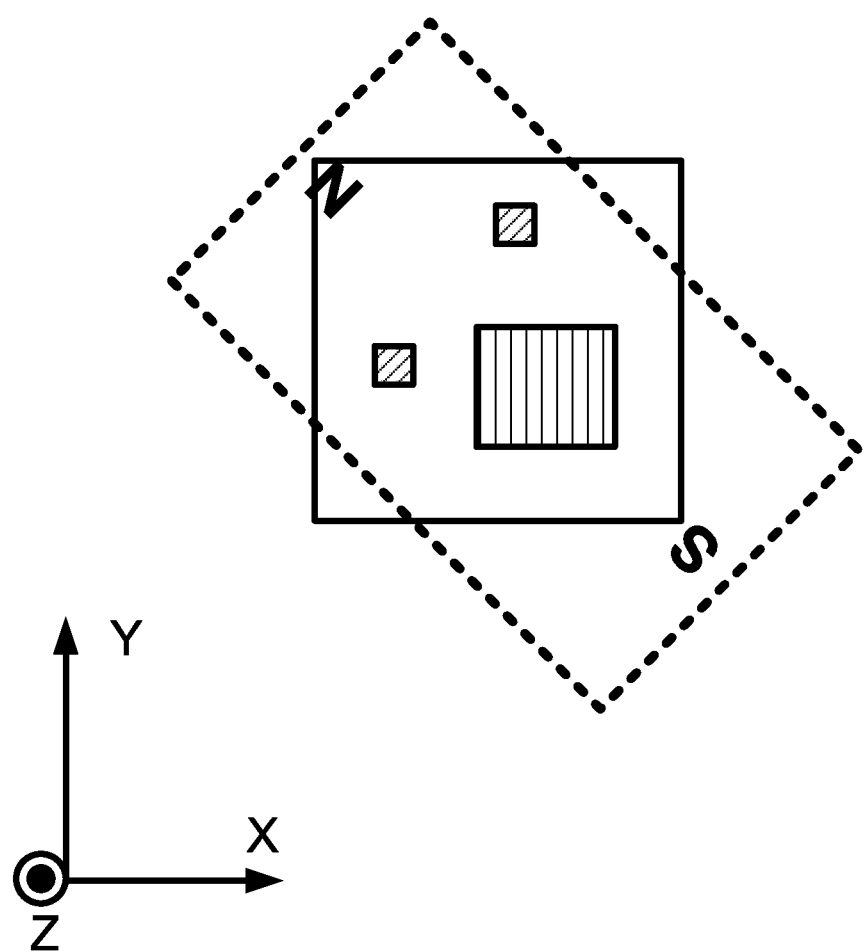

FIGS. 6A-6H are conceptual diagrams illustrating top views of various angular orientations of an example sensing configuration as the magnetic source rotates through a 360 degree angular spectrum according to this disclosure. The conceptual diagrams in FIGS. 6A-6H each include a top view similar to that shown in FIG. 2 except that a magnet represented by the dotted lines is superimposed over sensing device 30. Each of FIGS. 6A-6H represents a particular angular orientation or position of the magnet with respect to sensing device 30. For examples, FIG. 6A represents the angular orientation associated with the arrow marked as "A" in FIG. 5. Similarly, FIGS. 6B-6H represent the angular orientations associated, respectively, with the arrows marked "B" through "H" in FIG. 5.

Figure 7:
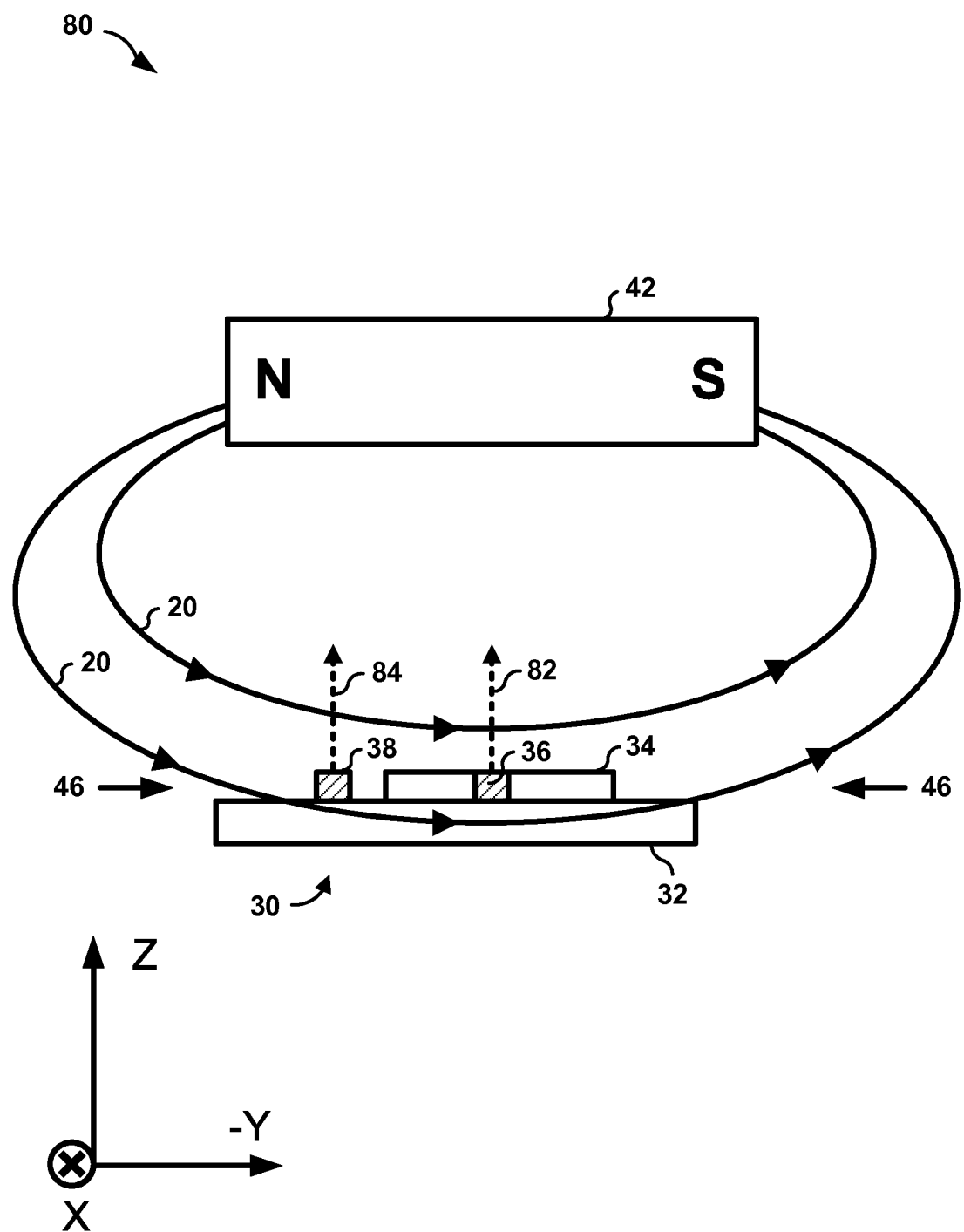
FIG. 7 is a conceptual diagram illustrating a side view of the magnetic field incident upon the sensing device when the magnetic field source and the sensing device are oriented in the configuration of FIG. 6A.

FIG. 7 is a conceptual diagram illustrating a side view 80 of the magnetic field incident upon sensing device 16 when the magnetic source and the sensing device are oriented in the configuration of FIG. 6A. As shown in FIG. 7, angular position sensor 34 has a plane of sensitivity that is parallel to Hall sensor sensing plane 46. Thus, angular position sensor 34 is configured to sense angular components of incident magnetic field 20 that are incident upon angular position sensor 34 and parallel to Hall sensor sensing plane 46.

Each of polarity detectors 36 and 38 has a direction of sensitivity that is perpendicular to Hall sensor sensing plane 46. Thus, polarity detector 36 is configured to sense directional components of incident magnetic field 20 from a first location that are perpendicular to Hall sensor sensing plane 46 as represented by vector 82. Similarly, polarity detector 38 is configured to sense directional components of incident magnetic field 20 from a second location that are perpendicular to Hall sensor sensing plane 46 as represented by vector 84. Thus, in the example shown in FIG. 7, polarity detectors 36 and 38 are configured to sense directional components of incident magnetic field 20 that are perpendicular to the sensing plane of angular position sensor 34. The sensing plane of angular position sensor 34 may be defined as the plane occupied by and/or parallel the Wheatstone bridge configurations in angular position sensor 34. However, in other examples, the direction of sensitivity of one or both of polarity detectors 36 and 38 may not be perpendicular to the sensing plane of angular position sensor 34. The directional component of incident magnetic field 20 sensed by each of polarity detector 36 and polarity detector 38 may be referred to as the respective sensed directional component for the polarity detector.

When polarity detector 36 detects the sensed directional components of incident magnetic field 20 as pointing in a first direction (e.g., a negative direction with respect the direction of sensitivity), then polarity detector 36 generates a first logic value as the output value for polarity detector 36. When polarity detector 36 detects the sensed directional components as pointing a second direction, (e.g., a positive direction with respect the direction of sensitivity), then polarity detector 36 generates a second logic value as the output value for polarity detector 36. In some examples, an analog-to-digital converter, e.g., a comparator, may convert an analog magnitude of the sensed direction component into a digital logic value.

Polarity detector 36 may be said to operate in a transition state when polarity detector 36 detects the sensed directional components to be approximately equal to zero or within a particular range proximate to zero referred to herein as a transition range. When not operating in the transition state, polarity detector 36 may be said to operate in a negative sensing state when sensing negative sensed directional components and a positive sensing state when sensing positive sensed directional components. Polarity detector 38 operates in a similar fashion to polarity detector 36.

As shown in FIG. 7, when magnet 42 is positioned in angular position A (see FIG. 6A), the directional component of the magnetic field incident upon polarity detector 38 that is parallel to the direction of sensitivity of polarity detector 38 points in the negative direction. As such, polarity detector 38 operates in a negative sensing state and outputs a low logic value (see FIG. 5). On the other hand, the magnetic field incident upon polarity detector 36 is approximately perpendicular to the direction of sensitivity of polarity detector 36. Thus, directional component of the magnetic field incident upon polarity detector 36 is approximately equal to zero. Polarity detector 36 therefore operates in a transition state as shown in FIG. 5.

As the magnet rotates through each of positions B through H in FIGS. 6B-6H, the sensing states of polarity detector 36 and polarity detector 38 may vary. The sensing states corresponding to the angular orientations shown in FIGS. 6A-6H is detailed in the following table:

| Angular Position | Hall 1 sensing state | Hall 2 sensing state |
| --- | --- | --- |
| A | transition | negative |
| B | positive | negative |
| C | positive | transition |
| D | positive | positive |
| E | transition | positive |
| F | negative | positive |
| G | negative | transition |
| H | negative | negative |

Figure 8:
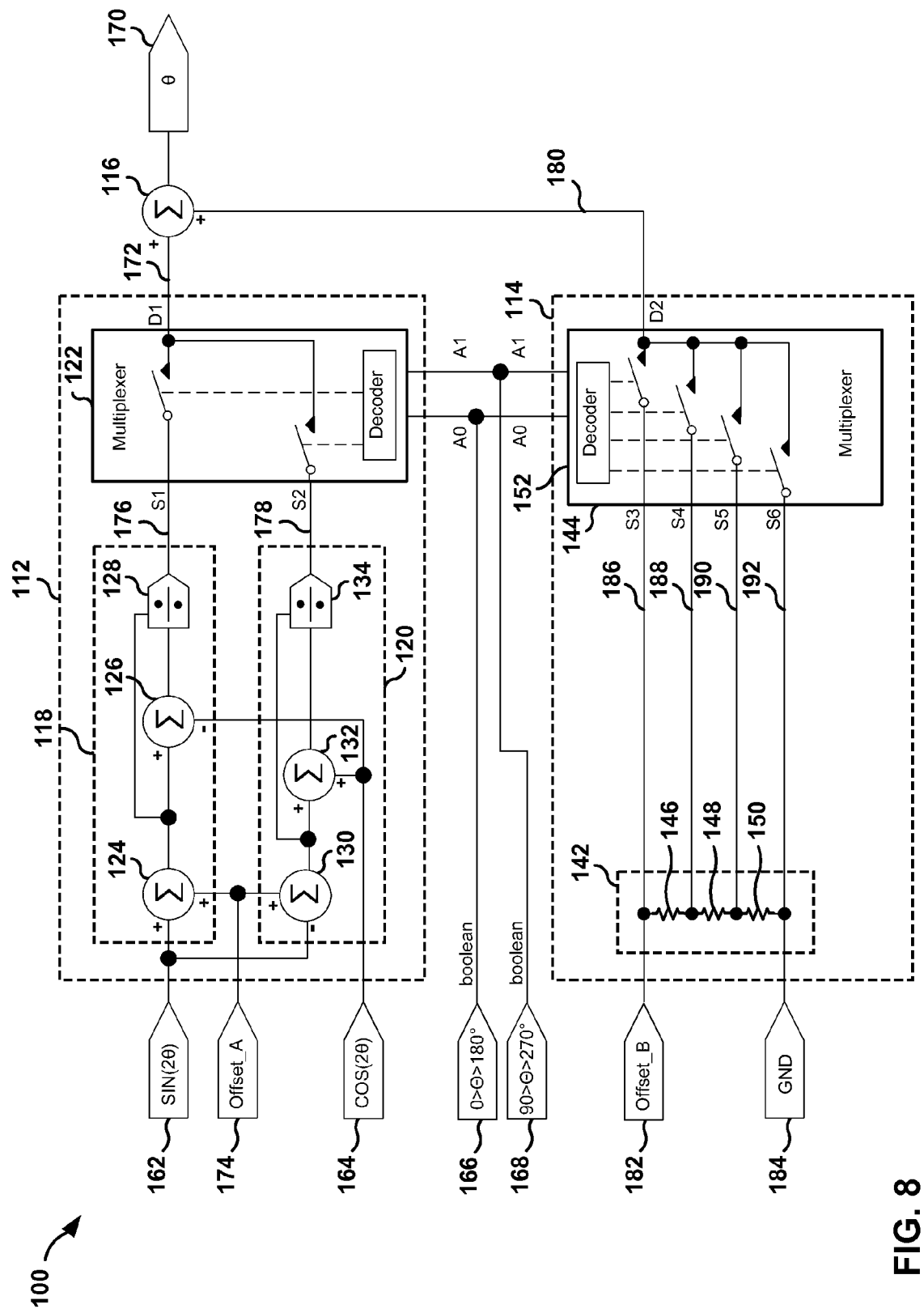
FIG. 8 is a schematic illustrating an example decoder device according to this disclosure.

FIG. 8 is a schematic illustrating an example decoder device 100 according to this disclosure. Decoder device 100 is configured to generate a decoded angular position signal 170 based on angular position signals 162 and 164 and half-phase signals 166 and 168. In some examples, decoder device 100 may correspond to decoder device 18 illustrated in FIG. 1, angular position signals 162 and 164 may together correspond to angular position signal 22 shown in FIG. 1, half-phase signal 166 may correspond to polarity signal 24 shown in FIG. 1, half-phase signal 168 may correspond to polarity signal 26 shown in FIG. 1 and decoded angular position signal 170 may correspond to decoded angular position signal 28 shown in FIG. 1. Decoder device 100 includes an intermediate signal generator 112, an offset value generator 114 and a summation node 116.

Decoder device 100 is configured to generate decoded angular position signal 170 based on angular position signals 162 and 164 and half-phase signals 166 and 168. In some examples, angular positions signals 162 and 164 may vary sinusoidally with respect to the angular position of incident magnetic field 20, and decoder device 100 may be configured to generate output signal 170 such that decoded angular position signal 170 varies in a substantially linear fashion with respect to the of incident magnetic field 20. Decoder device 100 includes an intermediate signal generator 112, an offset value generator 114 and a summation node 116.

Intermediate signal generator 112 is configured to generate an intermediate signal 172 based on angular position signals 162 and 164 and half-phase signals 166 and 168. Intermediate signal generator 112 includes a first input terminal electrically coupled to angular position signal 162, a second input terminal electrically coupled to angular position signal 164, a third input terminal electrically coupled to half-phase signal 166, and a fourth input terminal electrically coupled to half-phase signal 168. In some examples, intermediate signal generator 112 may include a fifth input terminal electrically coupled to offset value 174. In other examples, offset value 174 may be produced internally within intermediate signal generator 112. In any case, intermediate signal generator 112 may generate intermediate signal 172 based on offset value 174 in addition to sinusoidal signals 162 and 164. In the example decoder device 100 of FIG. 8, intermediate signal generator 112 includes transfer function circuits 118 and 120, and a candidate intermediate signal selector 122.

Angular position signal 162 and angular position signal 164 may be signals that are together indicative of the angular position of incident magnetic field 20. In some examples, the angular position of incident magnetic field 20 may be an angle within an angular spectrum, e.g., a 360 degree angular spectrum.

In some examples, angular position signal 162 may vary with respect to the angular position of incident magnetic field 20 according to a first sinusoidal function and angular position signal 164 may vary with respect to the angular position of incident magnetic field 20 according to a second sinusoidal function. As used herein, a sinusoidal function may refer to a function that oscillates like a sine function or a cosine function with respect to the angular position of incident magnetic field 20. The sine function or cosine function may be shifted, stretched and/or compressed. Each of the sinusoidal functions associated with angular position signal 162 and angular position signal 164 may have a period and a phase. A period, as used herein, may refer to the length of an interval of angular positions that contains one full cycle or repetition of the sinusoidal function. The phase, as used herein, may refer to where in the oscillation cycle a particular sinusoidal function begins.

In further examples, the period of the first sinusoidal function may be substantially equal to the period of the second sinusoidal function. In additional examples, the phase of the first sinusoidal function may be different from the phase of the second sinusoidal function. The type of sinusoidal function for the first sinusoidal function may, in some examples, be different from the type of sinusoidal function for the second sinusoidal function. For example, the first sinusoidal function may be a sine wave and the second sinusoidal function may be a cosine wave. It is recognized, however, that each of these different types of sinusoidal functions may be rewritten as the same type of sinusoidal function with an appropriate phase shift.

As shown in the specific example of FIG. 8, angular position signal 162 varies with respect to an angular position, θ, according to a sin 2θ sinusoidal function, and angular position signal 164 varies with respect to the angular position, θ, according to the cos 2θ sinusoidal function. Thus, in the specific example of FIG. 8, angular position signal 162 and angular position signal 164 vary with respect to θ according to sinusoidal functions that have substantially equal periods of 180 degrees. Because the cos 2θ function is equivalent to a phase-shifted version of the sin 2θ function, angular position signal 162 and angular position signal 164 may be said to vary with respect to θ according to sinusoidal functions that have different phases.

In the example configuration shown in FIG. 8, intermediate signal generator 112 includes a transfer function circuit 118, a transfer function circuit 120, and a candidate intermediate signal selector 122. Transfer function circuit 118 is configured to generate candidate intermediate signal 176 based on angular position signal 162, angular position signal 164 and offset value 174. In some examples, candidate intermediate signal 176 may vary with respect to the angular position of incident magnetic field 20 in a substantially linear fashion for one or more ranges or intervals of angular positions. In other words, for a particular interval of angular positions, as the angular position varies, candidate intermediate signal 176 may vary according to a function that has a substantially constant slope over the particular interval. In some implementations, the length of the interval of angular positions for which candidate intermediate signal 176 varies in a substantially linear fashion may be greater than the length of the interval of angular positions for which either of sinusoidal signals 162 and 164 approximates a linear function. For example, the length of the interval may be greater than or equal to 90 degrees.

Transfer function circuit 120 is configured to generate candidate intermediate signal 178 based on angular position signal 162, angular position signal 164 and offset value 174. Similar to candidate intermediate signal 176, candidate intermediate signal 178 may vary with respect to the angular position of incident magnetic field 20 in a substantially linear fashion for one or more ranges or intervals of angular positions. In some implementations, the length of the interval of angular positions for which candidate intermediate signal 178 varies in a substantially linear fashion may be greater than the length of the interval of angular positions for which either of sinusoidal signals 162 and 164 approximates a linear function. For example, the length of the interval may be greater than or equal to 90 degrees.

The one or more intervals of angular positions over which candidate intermediate signal 178 is substantially linear may be different from the one or more intervals over which candidate intermediate signal 176 is substantially linear. However, these intervals may be overlapping within one or more sub-intervals.

Figure 9:
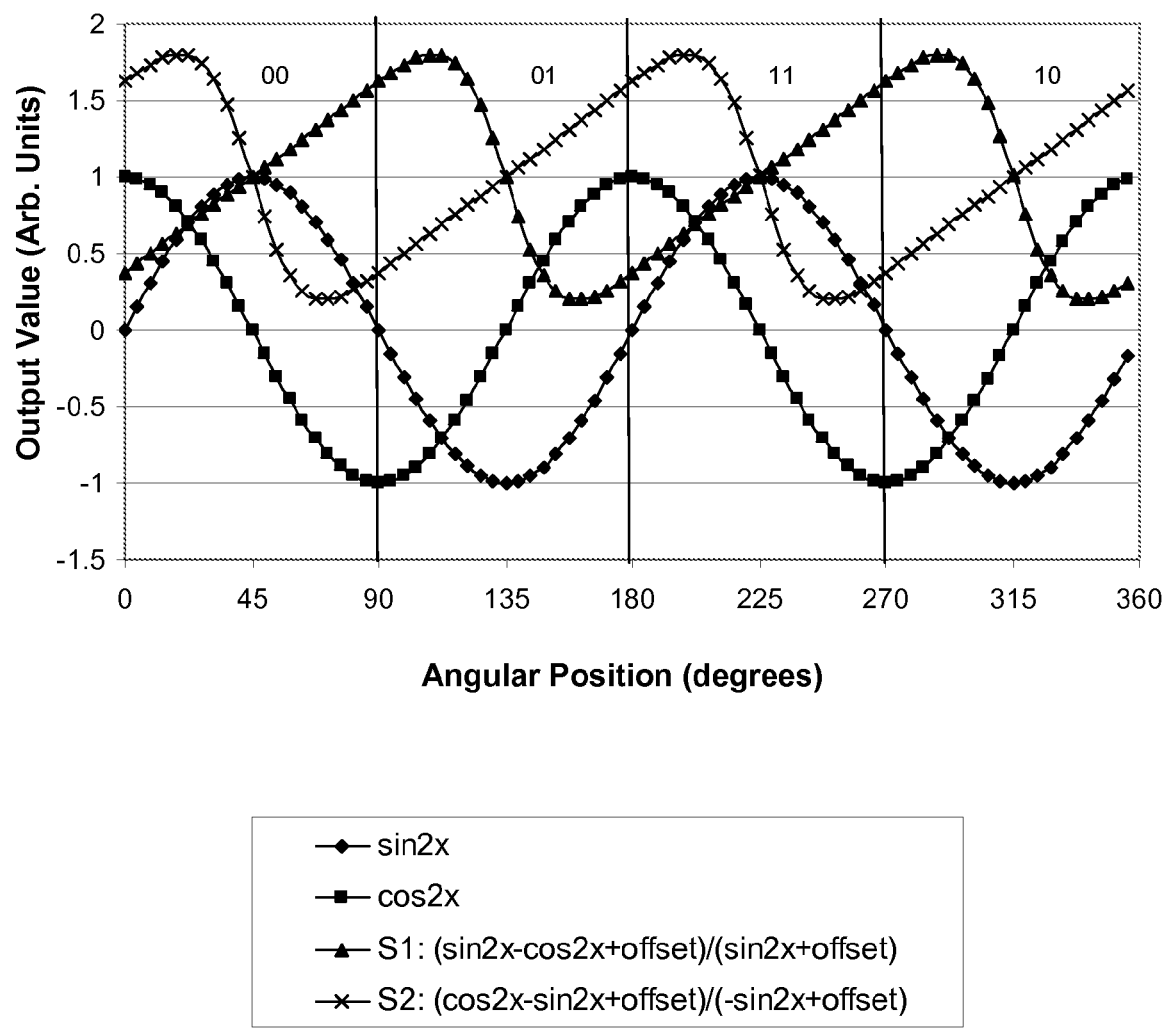
FIG. 9 is a graph illustrating input signals and transfer functions for the example decoder device of FIG. 8 according to this disclosure.

As shown in FIG. 9, for the specific example decoder device 100 of FIG. 8, candidate intermediate signals 176 (S1) and 178 (S2) each vary linearly with respect to the angular position of incident magnetic field 20 for at least one-half of the period of angular position signals 162 and 164. More specifically, candidate intermediate signal 176 (S1) is substantially linear over a first interval of angular positions that includes angular positions within the range of 0 degrees to 90 degrees and a second interval of angular positions that includes angular positions within the range of 180 degrees to 270 degrees as shown in FIG. 9. Meanwhile, candidate intermediate signal 178 (S2) is substantially linear over a first interval of angular positions that includes angular positions within the range of 90 degrees to 180 degrees and a second interval of angular positions that includes angular positions within the range of 270 degrees to 360 degrees. As shown in FIG. 9, the intervals of angular positions over which candidate intermediate signal 176 (S1) and candidate intermediate signal 178 (S2) are substantially linear may also include angular positions that extend outside of the ranges identified above in either direction.

Referring back to FIG. 8, transfer function circuit 118 performs one or more arithmetic operations to generate candidate intermediate signal 176. The one or more arithmetic operations may include operations, such as, e.g., addition, subtraction, multiplication and/or division. In the example transfer function circuit 118 of FIG. 8, transfer function circuit 118 generates candidate intermediate signal 176 according to the following transfer function:

$$S1 = \frac{\sin2\theta - \cos2\theta + \text{off}}{\sin2\theta + \text{off}} \quad (1)$$

where S1 corresponds to candidate intermediate signal 176, θ corresponds to the angular position of incident magnetic field 20, sin 2θ corresponds to angular position signal 162, cos 2θ corresponds to angular position signal 164, and off corresponds to offset value 174.

Transfer function circuit 120 performs one or more arithmetic operations to generate candidate intermediate signal 178. The set of arithmetic operations performed by transfer function circuit 120 may be different than the set of arithmetic operations performed by transfer function circuit 118. In the particular example of FIG. 8, transfer function circuit 120 generates candidate intermediate signal 178 according to the following transfer function:

$$S2 = \frac{\cos2\theta - \sin2\theta + \text{off}}{-\sin2\theta + \text{off}} \quad (2)$$

where S2 corresponds to candidate intermediate signal 178, θ corresponds to the angular position of incident magnetic field 20, sin 2θ corresponds to angular position signal 162, cos 2θ corresponds to angular position signal 164, and off corresponds to offset value 174.

In some examples, offset value 174 may be substantially constant, e.g., offset value 174 may be a substantially constant voltage. Offset value 174 may be selected such that S1 and S2 both include linear regions that are greater than or equal to 90 degrees. For example, offset value 174 may be within the range of approximately 1 to approximately 10 times the amplitude of one or both of sinusoidal signals 162 and 164. In some examples, offset value 174 may be substantially equal to 1.6 times the amplitude of one or both of sinusoidal signals 162 and 164 in order to provide candidate intermediate signals 176 and 178 that have a high degree of linearity. Other values for offset value 174, however, may be selected to adjust the slope and/or linearity of candidate intermediate signals 176 and 178. In additional examples, offset value 174 and offset voltage 182 may be selected such that the product of offset voltage 182 divided by 3 and offset value 174 is approximately equal to 2 times the amplitude of sinusoidal signals 162 and 164 in order to provide an output signal 170 with a high degree of linearity. In such examples, offset value 174 may be adjusted to control the value of offset voltage 182 needed to maintain the product of approximately 2 times the amplitude of the sinusoidal signals 162 and 164.

Transfer functions (1) and (2) represent angular position signal 162 and angular position signal 164 as sinusoidal functions with respect to the angular position of incident magnetic field 20. These transfer functions may be rewritten without the angular position parameter to better illustrate the operations that may be implemented by transfer function circuit 118 and transfer function circuit 120. For example, transfer function circuit 118 may be configured to generate candidate intermediate signal 176 according to the following transfer function:

$$S1 = \frac{A - B + \text{off}}{A + \text{off}} \quad (3)$$

where S1 corresponds to candidate intermediate signal 176, A corresponds to angular position signal 162, B corresponds to angular position signal 164, and Off corresponds to offset value 174. Similarly, transfer function circuit 120 may be configured to generate candidate intermediate signal 178 according to the following transfer function:

$$S2 = \frac{B - A + \text{off}}{-A + \text{off}} \quad (4)$$

where S2 corresponds to candidate intermediate signal 178, A corresponds to angular position signal 162, B corresponds to angular position signal 164, and Off corresponds to offset value 174.

In the example decoder 100 of FIG. 8, transfer function circuit 118 includes summation unit 124, subtraction unit 126 and divider unit 128, and transfer function circuit 120 includes subtraction unit 130, summation unit 132 and divider unit 134. Summation units 124 and 132 are each configured to add two input values to produce an output value that is equal to the sum of the two input values. Subtraction units 126 and 130 are each configured to subtract a second input value from a first input value to produce an output value that is equal to the difference between the two input values.

Summation unit 124 includes a first addend input terminal electrically coupled to angular position signal 162, a second addend input terminal electrically coupled to offset value 174, and an output terminal. Subtraction unit 126 includes a minuend input terminal electrically coupled to the output terminal of summation unit 124, a subtrahend input terminal electrically coupled to angular position signal 164, and an output terminal. Subtraction unit 130 includes a minuend input terminal electrically coupled to offset value 174, a subtrahend input terminal electrically coupled to angular position signal 162, and an output terminal. Summation unit 132 includes a first addend input terminal electrically coupled to the output terminal of subtraction unit 130, a second addend input terminal electrically coupled to angular position signal 164, and an output terminal.

Divider unit 128 and subtraction unit 130 are each configured to divide a first input value by a second input value to produce an output value that is equal to the quotient of the first input value divided by the second input value. Divider unit 128 includes a dividend input terminal electrically coupled to the output terminal of subtraction unit 126, a divisor input terminal electrically coupled to the output terminal of summation unit 124, and an output terminal electrically coupled to candidate intermediate signal selector 122. Divider unit 134 includes a dividend input terminal electrically coupled to the output terminal of summation unit 132, a divisor input terminal electrically coupled to the output terminal of subtraction unit 132, and an output terminal electrically coupled to candidate intermediate signal selector 122. The output terminal of divider unit 128 may form the output terminal of transfer function circuit 118 that outputs candidate intermediate signal 176, and the output terminal of divider unit 134 may form the output terminal of transfer function circuit 120 that outputs candidate intermediate signal 178.

Half-phase signal 166 may be a signal that is indicative of a half-phase occupied by the angular position of incident magnetic field 20 within a first half-phase partition. Half-phase signal 168 may be a signal that is indicative of a half-phase occupied by the angular position of incident magnetic field 20 within a second half-phase partition. As used herein, a half-phase may refer to a sub-interval of an interval of angular positions spanning one period of one or both of angular position signal 162 and angular position signal 164. For example, an interval of angular positions spanning one period of angular position signal 162 and/or angular position signal 164 may be sub-divided or partitioned into two sub-intervals according to a half-phase partition. Each of these sub-intervals may be referred to as a half-phase within the half-phase partition.

In some examples, one or both of half-phase signal 166 and half-phase signal 168 may be a digital signal that takes on one of two different binary logic values. In other examples, one or both of half-phase signal 166 and half-phase signal 168 may be an analog signal, and decoder device 100 may use a comparator or other analog-to-digital converter to generate a digital signal indicative of the half-phase occupied by the angular position of incident magnetic field 20. Half-phase signal 166 and half-phase signal 168 may be generated by one or more components external to decoder device 100. For example, one or more analog or digital Hall sensor may be used to generate half-phase signal 166 and/or half-phase signal 168.

In the specific example of FIG. 8, a first half-phase partition may be defined to include a first half-phase that corresponds to angular positions, θ, where 0°≤θ≤180° and a second half-phase that corresponds to angular positions, θ, where 180°<θ≤360°. A second half-phase partition may be defined to include a first half-phase that corresponds to angular positions, θ, where 90°≤θ≤270° and a second half-phase that corresponds to angular positions, θ, where 0°<θ≤90° or 270°<θ≤360°. In other examples, however, the half-phases may be partitioned differently and the transitions between the half-phase may occur at different angular positions. In addition, although the half-phases used for the example of FIG. 8 are equal in length, i.e., 180 degrees, the half-phases need not necessarily be equal in length.

The combination of half-phase information provided by half-phase signals 166 and 168 may be referred to herein as quadrant information. A first quadrant may be defined to correspond to angular positions, θ, where 0°≤θ≤90°, a second quadrant may be defined to correspond to angular positions, θ, where 90°≤θ≤180°, a third quadrant may be defined to correspond to angular positions, θ, where 180°≤θ≤270°, and a fourth quadrant may be defined to correspond to angular positions, θ, where 270°≤θ≤360°. In other examples, however, the quadrants may be partitioned differently and the quadrant transitions may occur at different angular positions. In addition, although the quadrants used for the example of FIG. 8 are equal in length, i.e., 90 degrees, the quadrants need not necessarily be equal in length.

Candidate intermediate signal selector 122 is configured to select one of candidate intermediate signal 176 and candidate intermediate signal 178 to output as intermediate signal 172 based on half-phase signal 166 and half-phase signal 168. In the example configuration of FIG. 8, candidate intermediate signal selector 122 selects candidate intermediate signal 176 to output as intermediate signal 172 if half-phase signal 166 is equal to half-phase signal 168, and candidate intermediate signal selector 122 selects candidate intermediate signal 178 to output as intermediate signal 172 if half-phase signal 166 is not equal to half-phase signal 168. Candidate intermediate signal selector 122 includes a first input terminal electrically coupled to the output terminal of transfer function circuit 118, a second input terminal electrically coupled to the output terminal of transfer function circuit 120, a first control terminal electrically coupled to half-phase signal 166, a second control terminal electrically coupled to half-phase signal 168, and an output terminal that may form the output terminal of intermediate signal generator 112 that outputs intermediate signal 172.

Candidate intermediate signal selector 122 includes decoder 136 and switches 138 and 140. Decoder 136 may control switches 138 and 140 to direct one of candidate intermediate signal 176 or candidate intermediate signal 178 to the output terminal of candidate intermediate signal selector 122 based on half-phase signal 166 and half-phase signal 168. For example, decoder 136 may close switch 138 and open switch 140 if half-phase signal 166 is equal to half-phase signal 168, and open switch 138 and close switch 140 if half-phase signal 166 is not equal to half-phase signal 168.

Offset value generator 114 is configured to generate an offset value 180 based on half-phase signal 166 and half-phase signal 168. Offset value generator 114 includes a first control terminal electrically coupled to half-phase signal 166, and a second control terminal electrically coupled to half-phase signal 168. In some examples, intermediate signal generator 112 may include one or both of an input terminal electrically coupled to offset voltage 182 and an input terminal electrically coupled to ground voltage 184. In other examples, one or both of offset voltage 182 and ground voltage 184 may be produced internally within offset value generator 114. Offset value generator 114 includes an candidate offset value generator 142 and a offset value selector 144.

Candidate offset value generator 142 is configured to generate candidate offset values 186, 188, 190 and 192 based on offset voltage 182 and ground voltage 184. Candidate offset value generator 142 includes a first input terminal electrically coupled to offset voltage 182, a second input terminal electrically coupled to ground voltage 184, and four output terminals each electrically coupled to offset value selector 144. Candidate offset value generator 142 also includes resistances 146, 148 and 150. In some examples, resistances 146, 148 and 150 may have equal resistance values. A first terminal of resistance 146 is electrically coupled to offset voltage 182, and a first output terminal of candidate offset value generator 142. A second terminal of resistance 146 is electrically coupled to a first terminal of resistance 148, and a second output terminal of candidate offset value generator 142. The first terminal of resistance 148 is electrically coupled to the second terminal of resistance 146, and to the second output terminal of candidate offset value generator 142. A second terminal of resistance 148 is electrically coupled to a first terminal of resistance 150, and a third output terminal of candidate offset value generator 142. The first terminal of resistance 150 is electrically coupled to the second terminal of resistance 148, and to the third output terminal of candidate offset value generator 142. A second terminal of resistance 150 is electrically coupled to ground voltage 184, and to a fourth output terminal of candidate offset value generator 142.

In some examples, offset voltage 182 may be substantially constant. The value of offset voltage 182 may be based on the distance at which the linear regions of S1 and S2 are offset from each other. For example, offset voltage 182 may be within the range of approximately 0.2 to approximately 2 times the amplitude of one or both of sinusoidal signals 162 and 164. In some examples, offset value 174 and offset voltage 182 may be selected such that the product of offset value 174 and one third of offset voltage 182 is approximately equal to 2 times the amplitude of the sinusoidal signals 162 and 164 in order to provide an output signal 170 with a high degree of linearity. In further examples, the value of offset voltage 182 may be selected such that the value of offset voltage 182 is approximately equal to 3.75 times the amplitude of one or both of sinusoidal signals 162 and 164 when offset value 174 is set to 1.6 times one or both of sinusoidal signals 162 and 164. Ground voltage 184 may be substantially equal to zero volts.

Offset value selector 144 is configured to generate an offset value 180 based on half-phase signal 166 and half-phase signal 168. For example, offset value selector 144 may select one of candidate offset value 186, candidate offset value 188, candidate offset value 190 and candidate offset value 192 to output as offset value 180 based on half-phase signal 166 and half-phase signal 168. In the example configuration of FIG. 8, offset value selector 144 selects candidate offset value 186 to output as offset value 180 when half-phase signal 166 is equal to a logic one value and half-phase signal 168 is equal to a logic zero value, candidate offset value 188 to output as offset value 180 when half-phase signal 166 is equal to a logic one value and half-phase signal 168 is equal to a logic one value, candidate offset value 190 to output as offset value 180 when half-phase signal 166 is equal to a logic zero value and half-phase signal 168 is equal to a logic one value, candidate offset value 192 to output as offset value 180 when half-phase signal 166 is equal to a logic zero value and half-phase signal 168 is equal to a logic zero value. Offset value selector 144 includes four input terminal each electrically coupled to a respective output terminal of candidate offset value generator 142. Offset value selector 144 also includes an output terminal that may form the output terminal of offset value generator 114 that outputs offset value 180. Offset value selector 144 includes decoder 152, and switches 154, 156, 158 and 160. Decoder 152 may control switches 154, 156, 158 and 160 to direct one of candidate offset value 186, candidate offset value 188, candidate offset value 190 and candidate offset value 192 to the output terminal of offset value selector 144 based on half-phase signal 166 and half-phase signal 168.

Summation node 116 is configured to add offset value 180 to intermediate signal 172 to produce decoded angular position signal 170. Summation node 116 includes a first addend input terminal electrically coupled to an output terminal of intermediate signal generator 112, a second addend input terminal electrically coupled to an output terminal of offset value generator 114, and an output terminal. The output terminal of summation node 116 may form the output terminal of decoder device 100 that produces decoded angular position signal 170.

Figure 10:
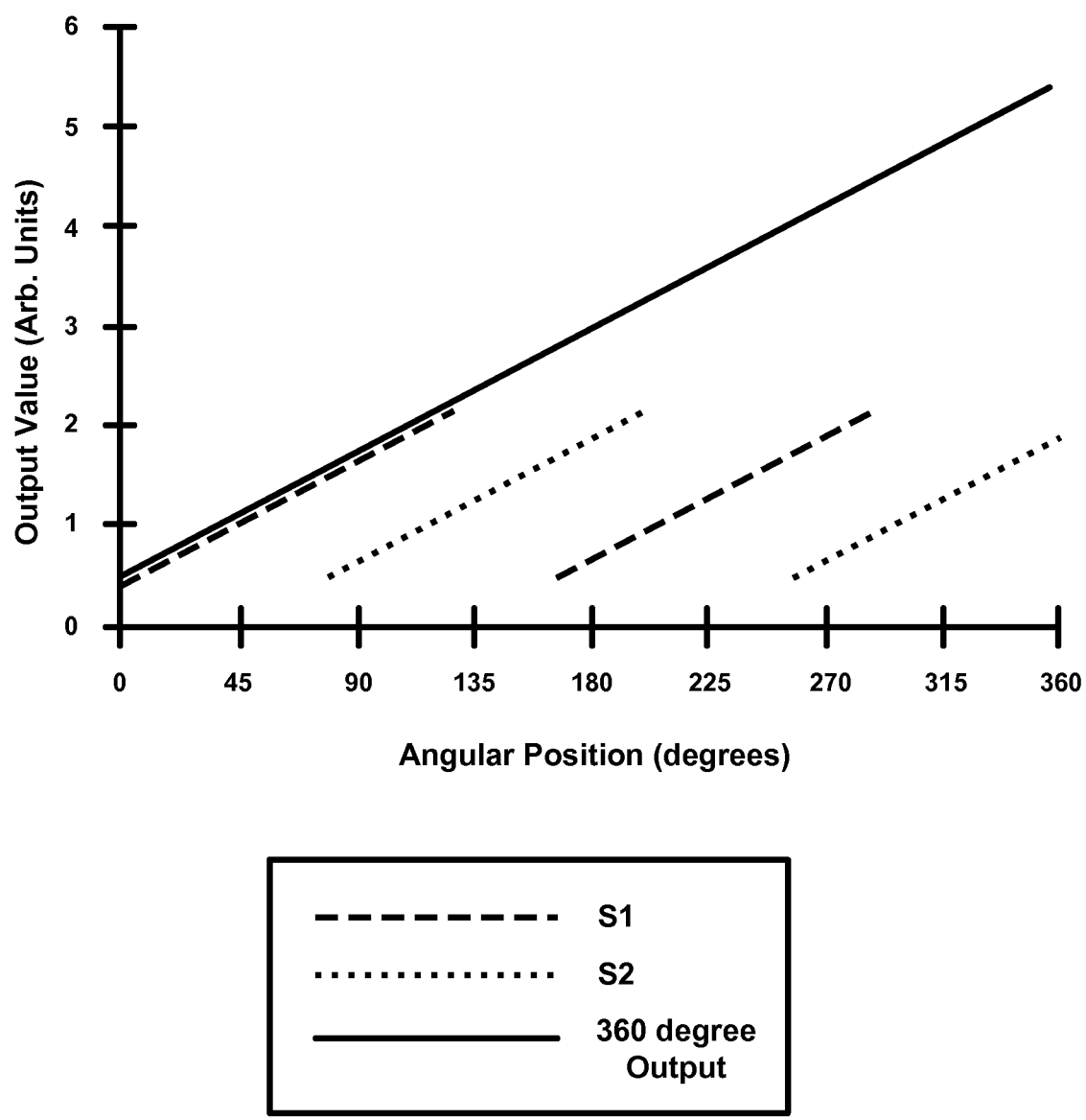
FIG. 10 is a graph illustrating how the example decoder device of FIG. 8 generates an output signal according to this disclosure.

The operation of decoder device 100 will now be described with respect to FIGS. 9 and 10. FIG. 9 is a graph illustrating sinusoidal signals 162 and 164 and transfer function outputs generated by transfer function circuits 118 and 120 according to this disclosure. FIG. 10 is a graph illustrating how decoder device 100 generates decoded angular position signal 170 based on intermediate signal 172 and offset value 180 according to this disclosure.

Decoder device receives angular position signal 162, angular position signal 164, half-phase signal 166 and half-phase signal 168 from sensing device 16. Transfer function circuit 118 applies a first transfer function to the values of angular position signal 162 and angular position signal 164 to generate candidate intermediate signal 176 (S1) illustrated in FIG. 9. Similarly, transfer function circuit 120 applies a second transfer function to the values of angular position signal 162 and angular position signal 164 to generate candidate intermediate signal 178 (S2) illustrated in FIG. 9. Candidate intermediate signal selector 122 selects one of candidate intermediate signal 176 and candidate intermediate signal 178 to output as intermediate signal 172 based on half-phase signal 166 and half-phase signal 168.

A first quadrant may be defined to correspond to angular positions, θ, where $0° \leq \theta \leq 90°$, a second quadrant may be defined to correspond to angular positions, θ, where $90° \leq \theta \leq 180°$, a third quadrant may be defined to correspond to angular positions, θ, where $180° \leq \theta \leq 270°$, and a fourth quadrant may be defined to correspond to angular positions, θ, where $270° \leq \theta \leq 360°$. As shown in FIG. 9, candidate intermediate signal 176 is substantially linear in the first quadrant and the third quadrant, and candidate intermediate signal 178 is substantially linear in the second quadrant and the fourth quadrant. As such, the quadrant information given to candidate intermediate signal selector 122 by half-phase signal 166 and half-phase signal 168 allows candidate intermediate signal selector 122 to select whichever of candidate intermediate signal 176 and candidate intermediate signal 178 is currently operating in a linear region. For example, when half-phase signal 166 and half-phase signal 168 indicate that angular position is either in the first or third quadrant, candidate intermediate signal selector 122 selects candidate intermediate signal 176 as intermediate signal 172. Similarly, when half-phase signal 166 and half-phase signal 168 indicate that the angular position is either in the second or fourth quadrant, candidate intermediate signal selector 122 selects candidate intermediate signal 178 as intermediate signal 172.

Meanwhile, candidate offset value generator 142 generates candidate offset values 186, 188, 190 and 192, and offset value selector 144 selects one of candidate offset values 186, 188, 190 and 192 as offset value 180 to add to intermediate signal 172. Summation node 116 adds offset value 180 to intermediate signal 172 to produce decoded angular position signal 170. Each value in decoded angular position signal 170 may map to a unique angular position within a period of sinusoidal signals 162 and 164. In this manner, decoder device 100 may implement a two-input arctangent function to decode two sinusoidal input signals without needing to use sequential memory elements or look-up tables.

In some examples, decoded angular position signal 170 may vary with respect to the angular position in a substantially linear fashion for at least the period of angular position signal 162 and/or angular position signal 164. In such examples, decoder 100 is able to provide a linear output that is indicative of the angular position without the need to use look-up tables.

As shown in FIG. 10, candidate intermediate signal 176 (S1) and candidate intermediate signal 178 (S2) may each be substantially linear within two different angular position intervals. The linear angular position intervals for candidate intermediate signal 176 may overlap with the linear angular position intervals for candidate intermediate signal 178 defining one or more overlap regions. Candidate intermediate signal 176 and candidate intermediate signal 178 may each be associated with two different offset values. For a given overlap region, the sum of candidate intermediate signal 176 and one of the offset values associated with candidate intermediate signal 176 may be substantially equal to the sum of candidate intermediate signal 178 and one of the offset values associated with candidate intermediate signal 178. Half-phase signal 166 and half-phase signal 168 may provide quadrant information indicative of a quadrant occupied by the angular position of incident magnetic field 20 and be used to select which of the two different candidate intermediate signals and associated offset values to use to generate the decoded output signal. Each transition between the four quadrants may be defined to occur within an interval of angular positions that defines a transition region. The set of angular positions that define a particular overlap region may encompass the set of angular positions that define a corresponding transition region. In other words, each angular position within a transition region may be included within the set of angular positions that define a corresponding overlap region. The transitions between quadrants, in some examples, may vary within a transition region due to an error tolerance within the sensors generating the signals indicative of the half-phases. By producing candidate intermediate signals and associated offset values that have substantially equal sums, decoder device 100 may be insensitive to variances in the transitions of half-phase signal 166 and half-phase signal 168 that are within the overlapping regions.

It should be noted that for angles proximate to the quadrant transition at 0 degrees and 360 degrees, two different outputs may occur. However, decoded angular position signal 170 may still be indicative of a unique angular position because each of these two signals can be mapped to a single angular position within a 360 degree interval. In addition, when decoded angular position signal 170 is said to vary with respect to the angular position in a substantially linear fashion over a full period of angular positions, e.g., 360 degrees, such a variance may include the understanding that angles proximate to the 0/360 degree quadrant transition may map to portions of decoded angular position signal 170 that extend beyond the maximum and minimum values for decoded angular position signal 170 shown in FIG. 10. Any of these outlier values may be mapped to a region within the 360 degree interval shown in FIG. 10 by applying a modulus operation followed by an offset operation to decoded angular position signal 170 with the modulus equal to the value of decoded angular position signal 170 at 360 degrees minus the value of decoded angular position signal 170 at zero degrees and the offset equal to the value of decoded angular position signal 170 at zero degrees.

FIG. 10 illustrates candidate intermediate signal 176 and decoded angular position signal 170 as being separated by a small offset. However, in some example, candidate intermediate signal 176 may substantially overlap decoded output signal 170, i.e., not be separated from output signal 170 by an offset.

Figure 11:
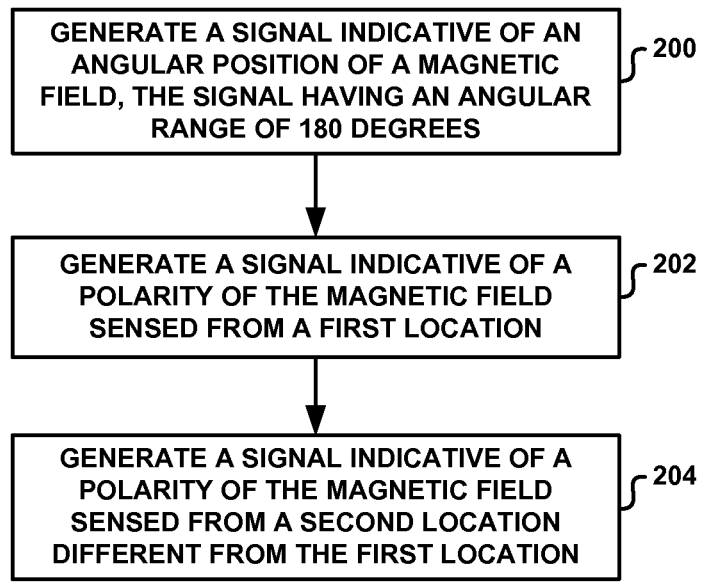
FIG. 11 is a flow diagram illustrating an example technique for generating magnetic field angular position information according to this disclosure.

FIG. 11 is a flow diagram illustrating an example technique for generating magnetic field angular position information according to this disclosure. In some examples, the technique in FIG. 11 may be used in sensing device 16 of FIG. 1 and/or in sensing device 30 of FIG. 2.

Sensing device 16 and/or angle position sensor 34 generates a signal indicative of an angular position of a magnetic field having an angular range of 180 degrees (200). Sensing device 16 and/or polarity sensor 36 generates a signal indicative of a polarity of the magnetic field sensed from a first location (202). Sensing device 16 and/or polarity sensor 38 generates a signal indicative of a polarity of the magnetic field sensed from a second location different from the first location (204).

Figure 12:
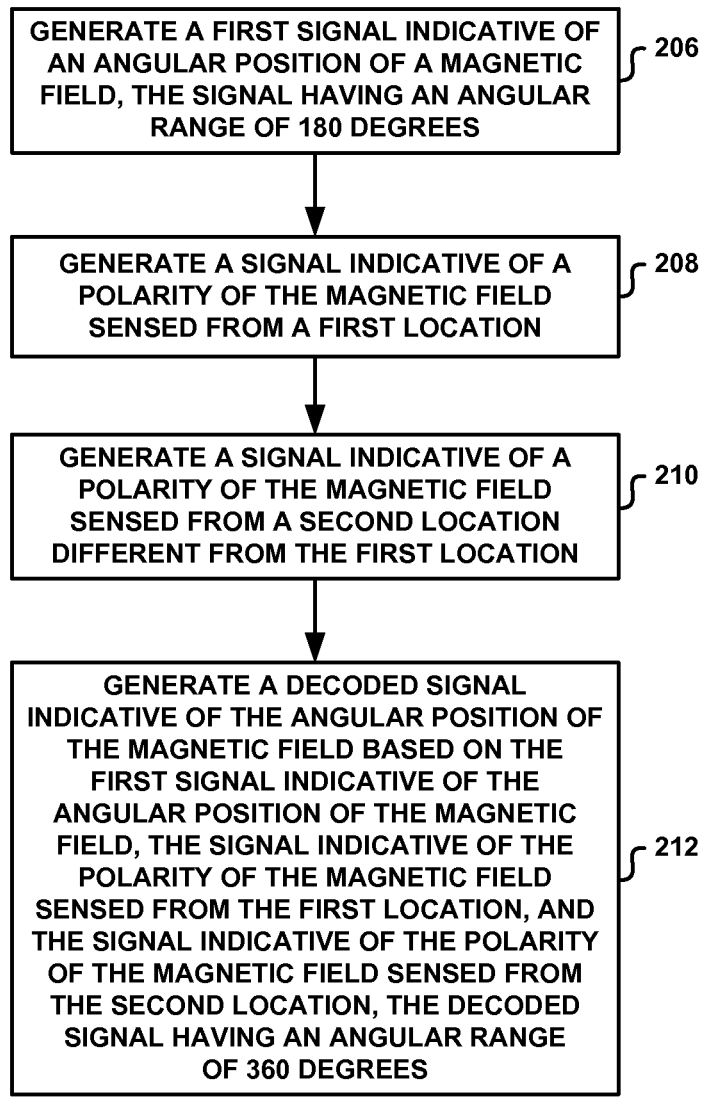
FIG. 12 is a flow diagram illustrating an example technique for generating a signal indicative of the angular position of a magnetic field within a 360 degree angular range according to this disclosure.

FIG. 12 is a flow diagram illustrating an example technique for generating a signal indicative of the angular position of a magnetic field within a 360 degree angular range according to this disclosure. In some examples, the technique in FIG. 12 may be used in sensing subsystem 14 of FIG. 1.

Sensing device 16 generates a first signal indicative of an angular position of a magnetic field, the signal having an angular range of 180 degrees (206). Sensing device 16 generates a signal indicative of a polarity of the magnetic field sensed from a first location (208). Sensing device 16 generates a signal indicative of a polarity of the magnetic field sensed from a second location different from the first location (210). Decoder device 18 generates a decoded signal indicative of the angular position of the magnetic field based on the first signal indicative of the angular position of the magnetic field, the signal indicative of the polarity of the magnetic field sensed from the first location, and the signal indicative of the polarity of the magnetic field sensed from the second location, the decoded signal having an angular range of 360 degrees (212).

Figure 13:
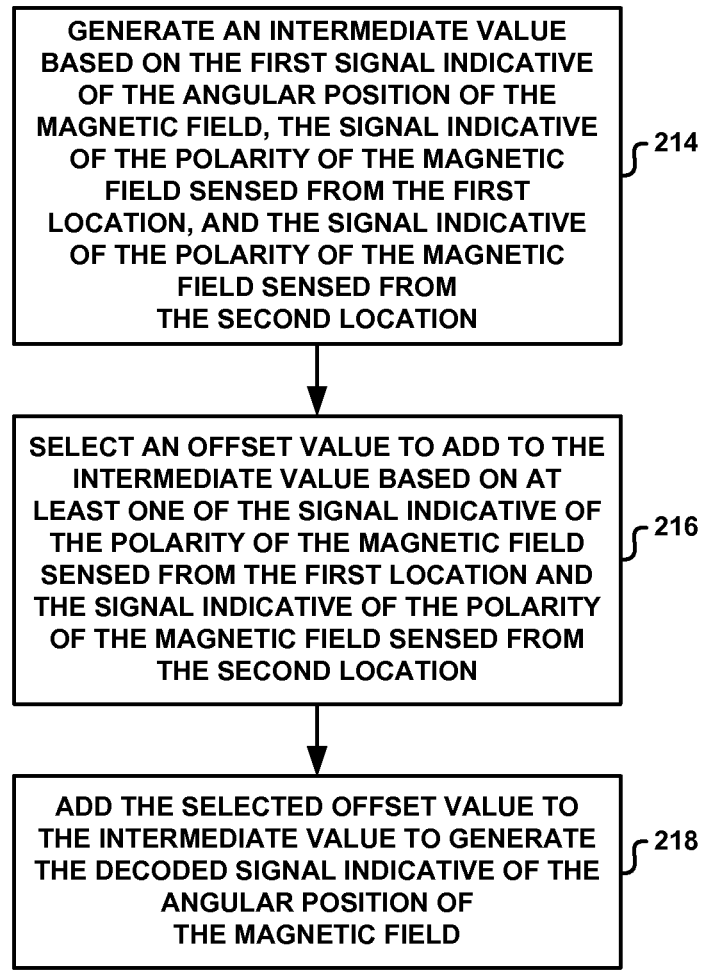
FIG. 13 is a flow diagram illustrating an example technique for generating a signal indicative of the angular position of a magnetic field according to this disclosure.

FIG. 13 is a flow diagram illustrating an example technique for generating a signal indicative of the angular position of a magnetic field according to this disclosure. In some examples, the technique in FIG. 13 may be used in decoder device 100 of FIG. 8. In further examples, the technique in FIG. 13 may be used to implement process box 212 illustrated in FIG. 12.

Intermediate signal generator 112 generates an intermediate value based on the first signal indicative of the angular position of the magnetic field, the signal indicative of the polarity of the magnetic field sensed from the first location, and the signal indicative of the polarity of the magnetic field sensed from the second location (214). Offset value generator 114 selects an offset value from a set of offset values to add to the intermediate value based on at least one of the signal indicative of the polarity of the magnetic field sensed from the first location and the signal indicative of the polarity of the magnetic field sensed from the second location (216). Summation node 116 adds the selected offset to the intermediate value to generate the decoded signal indicative of the angular position of the magnetic field.

Figure 14:
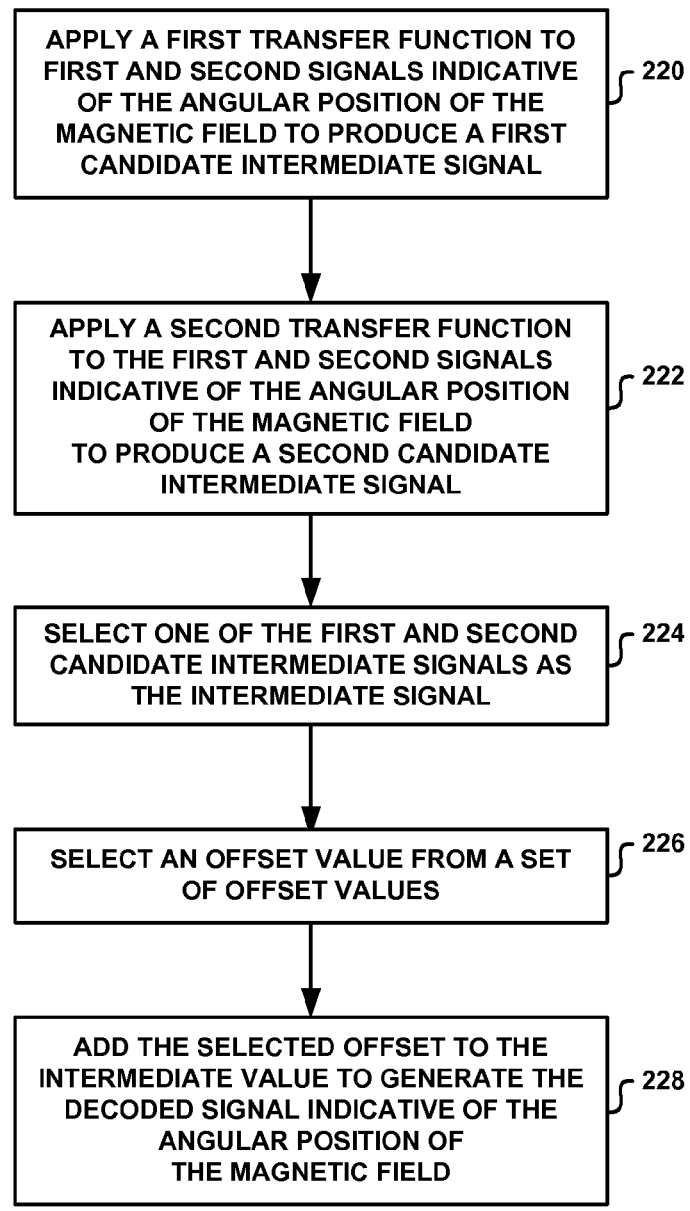
FIG. 14 is a flow diagram illustrating another example technique for generating a signal indicative of the angular position of a magnetic field according to this disclosure.

FIG. 14 is a flow diagram illustrating another example technique for generating a signal indicative of the angular position of a magnetic field according to this disclosure. In some examples, the technique in FIG. 14 may be used in decoder device 100 of FIG. 8. In further examples, the technique in FIG. 13 may be used to implement process box 212 illustrated in FIG. 12.

Transfer function unit 118 applies a first transfer function to first and second signals indicative of the angular position of the magnetic field to produce a first candidate intermediate signal (220). Transfer function unit 120 applies a second transfer function to the first and second signals indicative of the angular position of the magnetic field to produce a second candidate intermediate signal (222). Candidate intermediate signal selector 122 selects one of the first and second candidate intermediate signals as the intermediate signal (224). Offset value selector 114 selects an offset value from a set of offset values (226). In some examples, the set of offset values may include at least two offset values. In further examples, the set of offset values may include at least four offset values. Summation node 116 adds the selected offset to the intermediate value to generate the decoded signal indicative of the angular position of the magnetic field (228).

Although a few embodiments have been described in detail above, other modifications are possible. For example, the flow diagrams depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A device comprising:
   a magnetoresistive sensor configured to generate a signal indicative of angular direction of a magnetic field within a sensing plane, the signal having an angular range of 180 degrees;
   a first Hall sensor configured to generate a signal indicative of a polarity of the magnetic field sensed from a first location; and
   a second Hall sensor configured to generate a signal indicative of a polarity of the magnetic field sensed from a second location, wherein the first Hall sensor and the second Hall sensor are positioned in a quadrature configuration with respect to an axis of rotation of the magnetic field,
   wherein the first Hall sensor and the second Hall sensor are configured to sense directional components of the magnetic field that are perpendicular to the sensing plane.

2. The device of claim 1, wherein the device further comprises:
   a decoder configured to generate a decoded signal indicative of the angular direction of the magnetic field within the sensing plane based on the first signal indicative of the angular direction of the magnetic field within the sensing plane, the signal indicative of the polarity of the magnetic field sensed from the first location, and the signal indicative of the polarity of the magnetic field sensed from the second location, the decoded signal having an angular range of 360 degrees.

3. The device of claim 2, wherein the decoder comprises an analog decoder.

4. The device of claim 2, wherein the signal indicative of the angular direction of a magnetic field comprises a first sinusoidal signal and a second sinusoidal signal, and wherein the decoder further comprises:
   a first transfer function unit configured to apply a first transfer function to the first sinusoidal signal and the second sinusoidal signal to produce a first candidate intermediate signal;
   a second transfer function unit configured to apply a second transfer function to the first sinusoidal signal and the second sinusoidal signal to produce a second candidate intermediate signal;
   a candidate intermediate signal selector configured to select one of the first candidate intermediate signal and the second candidate intermediate signal as the intermediate signal based on the signal indicative of the polarity of the magnetic field sensed from the first location, and the signal indicative of the polarity of the magnetic field sensed from the second location;

an offset value selector configured to select an offset value from a set of offset values based on the signal indicative of the polarity of the magnetic field sensed from the first location, and the signal indicative of the polarity of the magnetic field sensed from the second location; and a summation node configured to add the selected offset to the intermediate value to generate the decoded signal indicative of the angular position direction of the magnetic field.

5. The device of claim 1, wherein the signal indicative of the angular direction of the magnetic field comprises one or more signals that vary sinusoidally with respect to the angular position of the magnetic field.

6. The device of claim 1,
wherein the magnetoresistive sensor, the first Hall sensor, and the second Hall sensor are each attached to a planar substrate,
wherein the magnetoresistive sensor is configured to sense components of the magnetic field that are coplanar with the planar substrate,
wherein the first Hall sensor is configured to sense components of the magnetic field that are perpendicular to the planar substrate at the first location, and
wherein the second Hall sensor is configured to sense components of the magnetic field that are perpendicular to the planar substrate at the second location.

7. A device comprising:
a magnetoresistive sensor configured to generate a signal indicative of an angular direction of a magnetic field within a sensing plane, the signal having an angular range of 180 degrees;
a first polarity sensor configured to generate a signal indicative of a polarity of directional components of the magnetic field perpendicular to the sensing plane sensed from a first location; and
a second polarity sensor configured to generate a signal indicative of a polarity of directional components of the magnetic field perpendicular to the sensing plane sensed from a second location different from the first location.

8. The device of claim 7,
wherein the sensing plane is defined as a plane that includes the first polarity sensor and the second polarity sensor and is perpendicular to an axis of rotation of the magnetic field, and
wherein the first polarity sensor and the second polarity sensor are positioned such that a measurement of an angle formed by the first polarity sensor, the second polarity sensor and a vertex defined at a location where the axis of rotation of the magnetic field intersects the sensing plane is within a range of approximately 70 degrees to approximately 110 degrees.

9. The device of claim 8, wherein the measurement of the angle is substantially equal to 90 degrees.

10. The device of claim 7, wherein the signal indicative of the angular direction of the magnetic field comprises one or more signals that vary sinusoidally with respect to the angular direction of the magnetic field.

11. The device of claim 7,
wherein the signal indicative of the polarity of the magnetic field sensed from the first location comprises a first digital signal, and
wherein the signal indicative of the polarity of the magnetic field sensed from the second location comprises a second digital signal.

12. The device of claim 7, wherein the magnetic field is generated by a magnetic source that is rotatable with respect to the magnetoresistive sensor.

13. The device of claim 7,
wherein the first polarity sensor comprises a first Hall sensor, and the second polarity sensor comprises a second Hall sensor.

14. The device of claim 7,
wherein the magnetoresistive sensor, the first polarity sensor, and the second polarity sensor are each attached to a planar substrate,
wherein the magnetoresistive sensor is configured to sense components of the magnetic field that are coplanar with the planar substrate,
wherein the first polarity sensor is configured to sense components of the magnetic field that are perpendicular to the planar substrate at the first location, and
wherein the second polarity sensor is configured to sense components of the magnetic field that are perpendicular to the planar substrate at the second location.

15. The device of claim 7,
wherein the first polarity sensor and the second polarity sensor are positioned in a quadrature configuration with respect to the magnetoresistive sensor.

16. A system comprising:
a sensor device comprising:
    a magnetoresistive sensor configured to generate a signal indicative of an angular direction of a magnetic field within a sensing plane, the signal having an angular range of 180 degrees;
    a first polarity sensor configured to generate a signal indicative of a polarity of the magnetic field sensed from a first location; and
    a second polarity sensor configured to generate a signal indicative of a polarity of the magnetic field sensed from a second location different from the first location,
    wherein the first Hall sensor and the second Hall sensor are configured to sense directional components of the magnetic field that are perpendicular to the sensing plane; and
a decoder device configured to generate a decoded signal indicative of the angular direction of a magnetic field based on the signal indicative of the angular direction of the magnetic field, the signal indicative of the polarity of the magnetic field sensed from the first location, and the signal indicative of the polarity of the magnetic field sensed from the second location, the decoded signal having an angular range of 360 degrees.

* * * * *